(12) United States Patent
Roberts

(10) Patent No.: US 10,084,327 B2
(45) Date of Patent: Sep. 25, 2018

(54) STORAGE AND CHARGING STATION SYSTEM FOR PORTABLE ELECTRONIC DEVICES

(71) Applicant: Nathan R. Roberts, Columbus, WI (US)

(72) Inventor: Nathan R. Roberts, Columbus, WI (US)

(*) Notice: Subject to any disclaimer, the term of this patent is extended or adjusted under 35 U.S.C. 154(b) by 213 days.

(21) Appl. No.: 14/136,644

(22) Filed: Dec. 20, 2013

(65) Prior Publication Data

US 2014/0175031 A1    Jun. 26, 2014

Related U.S. Application Data

(60) Provisional application No. 61/745,295, filed on Dec. 21, 2012.

(51) Int. Cl.

| | |
|---|---|
| *H02J 7/00* | (2006.01) |
| *H04B 1/3888* | (2015.01) |
| *H04M 1/04* | (2006.01) |
| *A45C 11/00* | (2006.01) |
| *A47B 57/20* | (2006.01) |
| *A45C 13/02* | (2006.01) |
| *A45C 15/00* | (2006.01) |

(52) U.S. Cl.
CPC ............ *H02J 7/0027* (2013.01); *A45C 11/00* (2013.01); *A45C 13/02* (2013.01); *A45C 15/00* (2013.01); *A47B 57/20* (2013.01); *H02J 7/0044* (2013.01); *H04B 1/3888* (2013.01); *A45C 2011/002* (2013.01); *H04M 1/04* (2013.01)

(58) Field of Classification Search
CPC ...... H02J 7/0027; H02J 7/0044; H04Q 1/002; A47B 57/16; A47B 57/20; A45C 2011/002; A45C 11/00; A45C 13/02; A45C 15/00; H04M 1/04; H04B 1/3888
USPC ..... 211/87.01, 90.01, 26, 26.2, 133.3, 133.4, 211/187
See application file for complete search history.

(56) References Cited

U.S. PATENT DOCUMENTS

| | | | | |
|---|---|---|---|---|
| 945,138 | A | * | 1/1910 | Peterson ................ A47B 57/42 |
| | | | | 211/87.01 |
| 1,609,355 | A | * | 12/1926 | Holle .................... A47B 47/03 |
| | | | | 108/61 |
| 2,920,244 | A | | 1/1960 | Jones et al. |
| 4,095,861 | A | | 6/1978 | Kachidurian et al. |

(Continued)

*Primary Examiner* — Stanton L Krycinski
(74) *Attorney, Agent, or Firm* — Boardman & Clark LLP

(57) ABSTRACT

A storage and management assembly for a plurality of portable electronic devices is provided. The assembly includes a tower assembly to define a vertical channel along a first side of the tower assembly. A plurality of shelves are removably coupled to a second side of the tower assembly, wherein the second side is opposite the first side, each of the shelves includes a storage bay defined by a bottom portion provided perpendicular to the first member, opposing raised edge portions provided about a portion of the perimeter of the bottom portion, and raised back tabs provided about a portion of the perimeter of the bottom portion, the plurality of shelves provided in a stacked vertical arrangement along the tower assembly. Alternatively, at least one modular portable carrier assembly for storing and charging a plurality of portable electronic devices may be removably coupled to the tower assembly.

16 Claims, 16 Drawing Sheets

(56) References Cited

U.S. PATENT DOCUMENTS

| | | | |
|---|---|---|---|
| 4,203,373 A * | 5/1980 | Conti | A47B 57/06 108/108 |
| 4,371,083 A | 2/1983 | Zingrini et al. | |
| 4,497,411 A * | 2/1985 | DeBortoli | H05K 7/186 211/189 |
| 4,662,524 A * | 5/1987 | Fullenkamp | A47B 57/565 211/190 |
| 5,186,337 A * | 2/1993 | Foster | A61G 13/107 174/493 |
| 5,644,876 A | 7/1997 | Walker | |
| 5,902,961 A | 5/1999 | Viklund et al. | |
| 6,102,214 A | 8/2000 | Mendoza | |
| 6,142,595 A | 11/2000 | Dellapi et al. | |
| 6,202,570 B1 | 3/2001 | Kurtsman et al. | |
| 6,223,909 B1 | 5/2001 | Mendoza et al. | |
| 6,347,714 B1 | 2/2002 | Fournier et al. | |
| 6,489,565 B1 | 12/2002 | Krietzman et al. | |
| 6,501,899 B1 | 12/2002 | Marrs et al. | |
| 6,504,100 B2 * | 1/2003 | Lawrence | H02B 1/202 174/100 |
| 6,541,705 B1 | 4/2003 | McGrath et al. | |
| 6,584,267 B1 | 6/2003 | Caveney et al. | |
| 6,614,978 B1 | 9/2003 | Caveney et al. | |
| 6,708,830 B2 | 3/2004 | Mendoza et al. | |
| 6,823,063 B2 | 11/2004 | Mendoza et al. | |
| 7,172,077 B2 | 2/2007 | Mendoza et al. | |
| 7,417,188 B2 | 8/2008 | McNutt et al. | |
| 7,562,779 B2 * | 7/2009 | Bravo | H05K 7/1449 211/26 |
| 7,762,405 B2 | 7/2010 | Mcgrath et al. | |
| 8,143,521 B2 | 3/2012 | Burek et al. | |
| D671,068 S | 11/2012 | Gieniec | |
| 8,307,996 B2 | 11/2012 | Taylor | |
| 8,628,157 B2 | 1/2014 | Burek et al. | |
| 8,833,571 B2 | 9/2014 | Anderson | |
| 9,124,105 B2 | 9/2015 | Gunderman et al. | |
| 9,323,288 B2 | 4/2016 | Dresser, III | |
| 9,343,916 B2 | 5/2016 | Emslie | |
| 2004/0007372 A1 | 1/2004 | Krietzman et al. | |
| 2004/0168818 A1 | 9/2004 | Layden et al. | |
| 2005/0275178 A1 | 12/2005 | Huesdash | |
| 2006/0171651 A1 | 8/2006 | Laursen | |
| 2009/0157907 A1 * | 6/2009 | Chapman | H02J 7/0027 710/8 |
| 2010/0133391 A1 | 6/2010 | Taylor et al. | |
| 2010/0176762 A1 * | 7/2010 | Daymude | H02J 7/0044 320/115 |
| 2012/0234778 A1 | 9/2012 | Anderson et al. | |
| 2014/0062390 A1 * | 3/2014 | Webber | H02J 7/0027 320/107 |

* cited by examiner

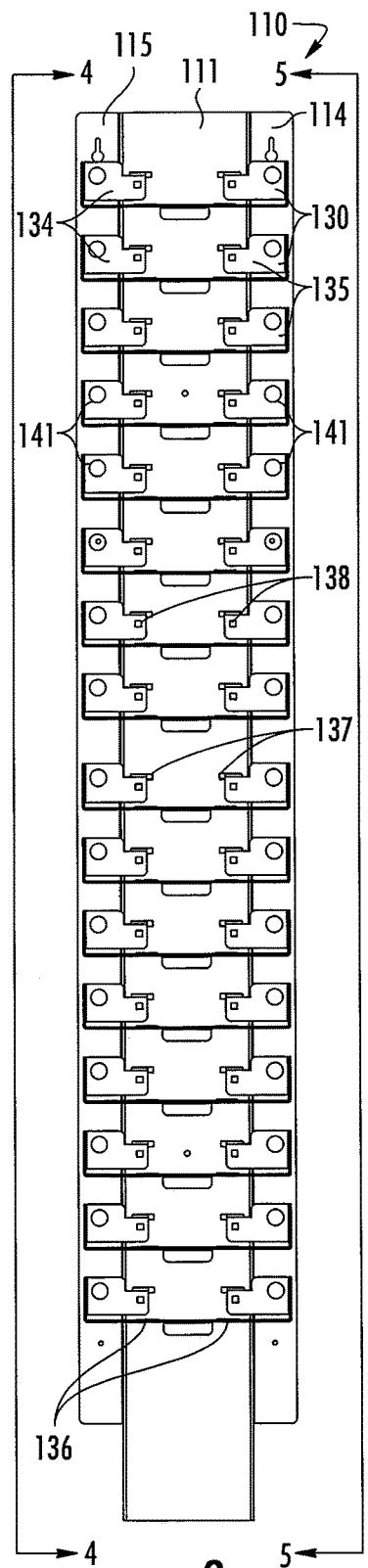
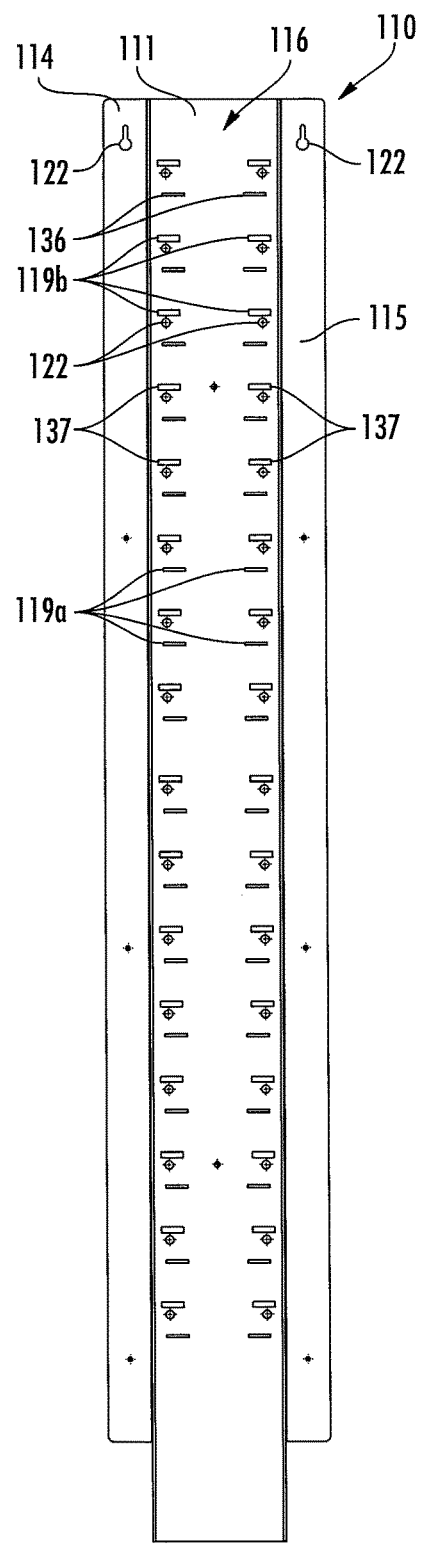
FIG. 2
FIG. 3

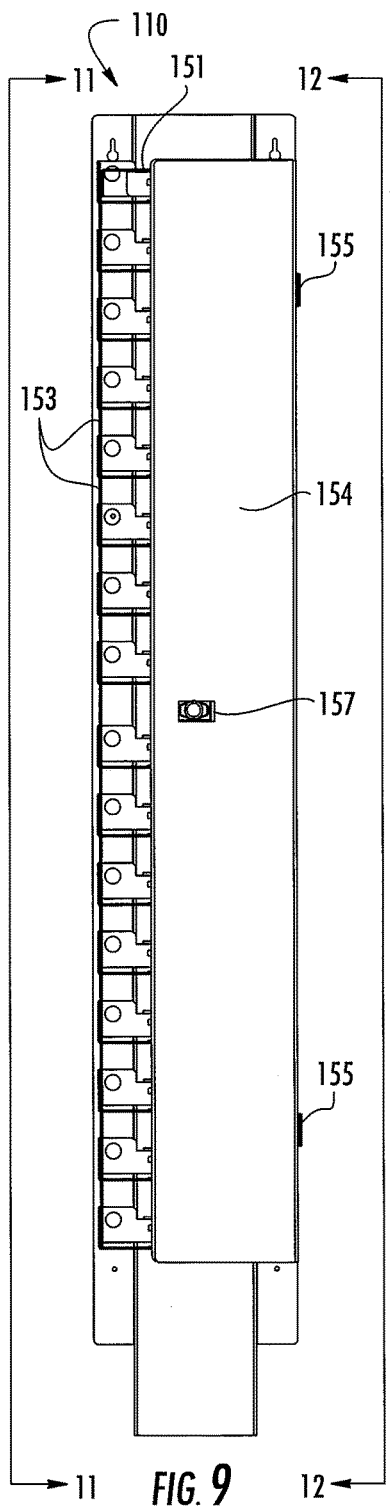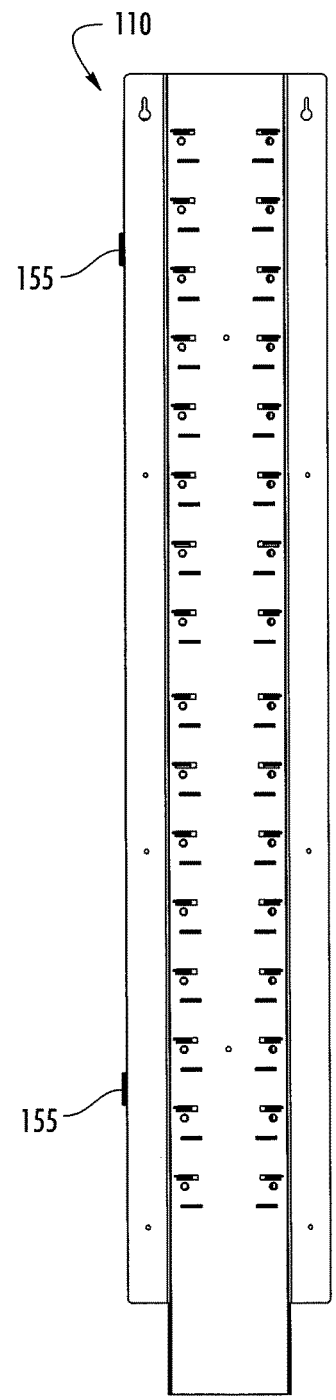

STORAGE AND CHARGING STATION SYSTEM FOR PORTABLE ELECTRONIC DEVICES

CROSS-REFERENCE TO RELATED APPLICATIONS

This application claims the benefit of U.S. Provisional Patent Application 61/745,295, entitled "Storage and Charging Station System for Portable Electronic Devices" and filed on Dec. 21, 2012, the contents of which are hereby incorporated herein by reference in their entirety.

FIELD OF THE INVENTION

The present invention relates to storage and charging systems for electronic devices. More specifically, the present invention relates to a system for centralized storage, charging, deployment, and inventorying of a plurality of portable electronic devices.

BACKGROUND

Portable electronic devices are generally known in the art. Portable electronic devices are quickly becoming common place in personal and professional endeavors, including educational and business settings. While use of portable electronic devices initially grew with individual use, organizations, including educational and business organizations, now will purchase a number of portable electronic devices for use by students, employees, or other users.

These purchasing organizations may desire a certain amount of control upon the portable electronic devices. The amount of control to assert may be dependent upon a number of factors considered by organizations, including, but not limited to, management of the portable electronic devices, inventory of the portable electronic devices, the type of user of portable electronic devices, the number of users for each portable electronic device, the environment in which the portable electronic device is in use, the relationship between the user and organization, the number of portable electronic devices in use, updating and maintenance of the portable electronic devices, and/or minimizing risk of loss and/or replacement costs of the portable electronic devices. Which factor(s) have the greatest weight dictating the necessary amount of control will be dependent upon the specific purchasing organization.

For example, in a school setting, a portable electronic device may be assigned to a specific student. That student may pick up the portable electronic device at a certain time during the school day, such as at the beginning of the school day, use it throughout the school day, and return the portable electronic device at the end of the school day. In another example, in a school setting, a classroom of students may use a number of portable electronic devices for a period of time during the day. As the students turn over in the classroom, such as by changing classes during the day, different students may use the number of portable electronic devices. As such, a plurality of different students may use a single portable electronic device during a day. In both of these examples, while utilizing the portable electronic devices as an educational tool is an outstanding way for students to learn, it can lead to issues in maintaining the portable electronic devices. For example, it may be difficult to inventory the devices during the day, charge or recharge the devices, account for the return of all devices once students complete use of the devices, and/or efficiently deploy new software or associated updates.

Similar to a school setting, portable electronic devices may be deployed for public use at libraries or other public access buildings. In this setting, the portable electronic devices may be checked out to users for a period of time. Again, many of the same problems as would arise in an educational setting, such as the ability to inventory or account for the return of all devices may arise at these public settings.

As another example, businesses or hospitals/medical service providers may deploy portable electronic devices in association with business operations or providing medical services, respectively. In order for efficiency or operational gains to be realized by use of the portable electronic devices, the portable electronic devices must be operational and must be used. The inability of the business or medical service provider to control the portable electronic devices can interrupt any efficiency or operational gains. For example, should an employee take a portable electronic device from the premises and forget to return it, that employee will not be able to use the portable electronic device during performance of his or her job. Similarly, if an employee fails to charge or recharge the battery of the portable electronic device, the portable electronic device can run out of power during an employee's work day, rendering the portable electronic device useless. As another example, should an employee remove the portable electronic device from the premises, the information stored on the electronic device may be misappropriated. This and other situations not referenced can lead to inefficiencies and unnecessary risks of loss.

As another example, various service industries may deploy portable electronic devices in association with the performance of services. As an example, certain service providers may employ a plurality of employees whom are deployed off-site to perform their job. These employees may each require a portable electronic device in the performance of their job responsibilities. In addition, these employees may require daily travel in the performance of their job responsibilities. Again, many of the same problems as recited above, such as forgetting, misplacing, losing, or failing to fully recharge portable electronic devices, or the failure of employees to properly maintain the portable electronic devices, may lead to interruption of efficiency, loss of operational gains, and/or unnecessary risk of loss.

As another example, sports teams may deploy portable electronic devices in association with preparation of athletes for sporting activities. For example, local, college, and/or professional sports teams may employ portable electronic devices to communicate plays or other game planning materials for athletes. For example, a sports team, such as an American football team, may communicate a playbook on a portable electronic device assigned to each player. While the portable electronic devices provide the ability for the player to easily transport and use game preparation materials outside of athletic facilities, there are some disadvantages. For example, it can be difficult for the sports team to easily and efficiently update game planning materials. Again using the example of an American football team, a professional team typically has 53 active players divided between offense and defense. Game planning materials typically are updated on a weekly basis depending upon the opponent any given week. Accordingly, it can be difficult to quickly and efficiently distribute updated game preparation materials to the portable electronic devices assigned to each of the players.

Further, the updating and distribution process becomes more onerous considering the minimum frequency of weekly update distribution.

Accordingly, what is needed is a system for centrally storing a number of portable electronic devices in a predetermined location. In addition, the system would allow for the batteries of the portable electronic devices to be charged and/or recharged. In addition, the system would provide a system for locking or protecting the portable electronic devices from misuse or theft. In addition, the system would provide a systematic fashion to facilitate storage, security, accountability, and instant inventory verification for the efficient management and use of the portable electronic devices.

SUMMARY OF THE DESCRIPTION

The present invention provides one or more examples of embodiments of a storage system for portable electronic devices. The system additionally provides for the charging and/or recharging of batteries which operate the portable electronic devices. The system additionally has a vertical profile to allow for the storage and charging of a number of portable electronic devices while minimizing the amount of space consumed by the system. The system additionally is expandable, providing for the easy addition or removal of storage bays. In addition, the system provides for easy verification of inventory and confirmation of device charging, as each of the storage bays has unique spacing and a tapered side arrangement to allow the contents of each storage bay to be easily visible. Further, the system implements a cable management system to provide for centralized charging and/or data distribution to the plurality of devices while reducing the visibility and entanglement of associated cables. In addition, the system distributes power to the plurality of devices to facilitate charging or recharging of the devices. The system further may incorporate a locking assembly to lock the plurality of devices into the assembly and reduce the risk of device theft. The storage and charging system advantageously provides for a central location for the storage, inventory, and identification of portable electronic devices, assisting in the deployment, inventory, management, and theft reduction of large numbers of portable electronic devices.

A storage and management assembly for a plurality of portable electronic devices is provided. The assembly includes a tower assembly having a first member coupled to a second member, and the first member coupled to a third member, the second and third members extending away from the first member to define a vertical channel along a first side of the tower assembly. In addition, a plurality of shelves are coupled to a second side of the tower assembly, wherein the second side is opposite the first side, each of the shelves includes a storage bay defined by a bottom portion provided generally perpendicular to the first member, opposing raised edge portions provided about a portion of the perimeter of the bottom portion, the plurality of shelves provided in a stacked vertically spaced arrangement along the tower assembly.

In addition, a storage and management tower assembly for a plurality of portable electronic devices is provided. The assembly includes a tower support, a cable management system defined by the tower support, the cable management system includes a central channel provided on a first side of the tower support, a plurality of shelves coupled to a second side of the tower support, the second side being opposite the first side, the plurality of shelves are provided in vertical alignment along the tower support, each of the plurality of shelves includes a storage bay defined by a bottom portion provided perpendicular to the tower support, opposing raised edge portions provided about a portion of the perimeter of the bottom portion, and back tabs provided about a portion of the perimeter of the bottom portion, a plurality of cable apertures provided through the tower support, wherein at least one cable aperture may be provided for each of the plurality of shelves, and a plurality of shelf apertures, wherein at least one shelf aperture may be provided in each of the plurality of shelves, the at least one shelf aperture is provided in one of the opposing raised edge portions or back tabs, wherein the cable management system facilitates storage and protection of one or more cables by allowing the one or more cables to extend from the central channel, through any such plurality of cable apertures, through the plurality of shelf apertures, to each of the shelves.

An expandable storage assembly for storing a plurality of portable electronic devices is also provided. The assembly includes a tower support portion having a first member coupled to a second member, and a third member coupled to the first member, the second and third members being provided at an angle to the first member such that the first, second, and third members define a vertical channel provided on a first side of the tower support portion. A plurality of vertically stacked shelves are coupled to a second side of the tower support portion, the second side being opposite the first side, each of the shelves include a storage bay defined by opposing first and second edge portions which extend away from a bottom portion, the first and second edge portions may have a tapered height as the first and second edge portions extend away from the tower support to provide visibility into each of the stacked shelves

BRIEF DESCRIPTION OF THE DRAWINGS

FIG. 2 is a front elevation view of the storage and charging station system of FIG. 1, taken along line 2-2 of FIG. 1.

FIG. 3 is a rear elevation view of the storage and charging station system of FIG. 1, taken along line 3-3 of FIG. 1.

FIG. 9 is a front elevation view of the storage and charging station system of FIG. 8, taken along line 9-9 of FIG. 8.

FIG. 10 is a rear elevation view of the storage and charging station system of FIG. 8, taken along line 10-10 of FIG. 8.

DETAILED DESCRIPTION

The invention illustrated in the Figures and disclosed herein is generally directed to one or more embodiments of a storage and charging station system for portable electronic devices. For ease of discussion and understanding, the following detailed description will at times refer to a "portable electronic device" 50, an "electronic device" 50, or a "plurality of electronic devices" 50. While certain Figures illustrate an electronic device 50 as a laptop computer, it should be appreciated that an electronic device may be any suitable portable electronic device requiring storage and/or battery charging or recharging. For example, an electronic device 50 may include, but is not limited to, a laptop computer, a netbook computer, a notebook computer, a Google Chromebook™ computer, a tablet device (such as an Apple iPad®, Samsung Galaxy®, or Microsoft Surface®, or any similar known or future developed tablet), a mobile smartphone, or any other known or future developed mobile or portable electronic device.

Figure 1:
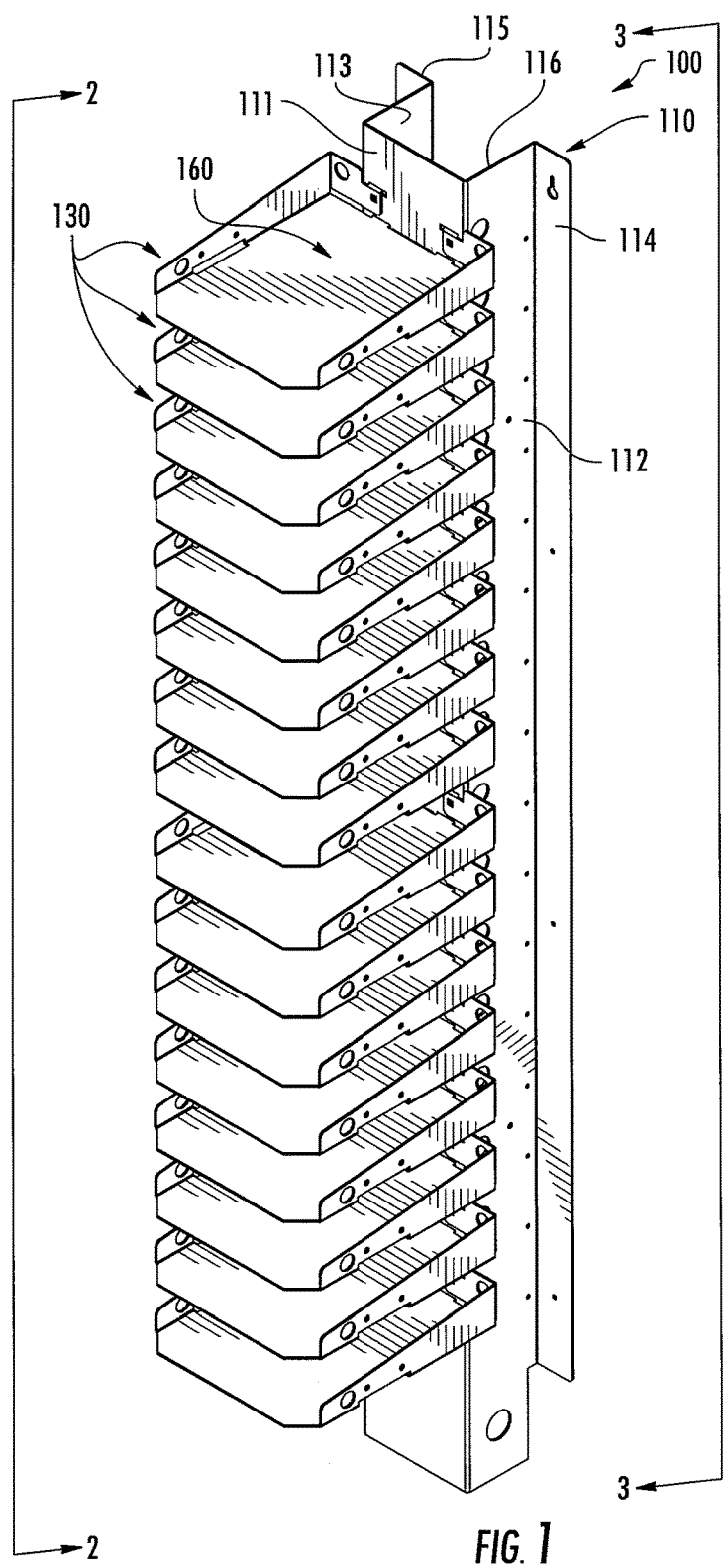
FIG. 1 is an isometric view of one or more examples of embodiments of a storage and charging station system for portable electronic devices.

Referring now to the Figures, FIGS. 1-5 illustrate one or more examples of embodiments of a storage and charging station assembly. Referring to FIG. 1, a tower assembly 100 is provided. Tower assembly 100 may include a mounting support portion or tower support 110. A plurality of shelf portions 130 may be coupled to tower support 110. Each of the plurality of shelf portions 130 define a storage bay 160 for receiving an electronic device 50 (not shown). The plurality of shelf portions 130 may be provided in a linear, spaced or stacked configuration on tower support 110. This configuration advantageously conserves space, minimizing the footprint of assembly 100. While mounting support portion 110 of FIG. 1 illustrates an array of sixteen shelf portions 130 coupled thereto, it should be appreciated in one or more examples of embodiments that the mounting support portion 110 may be any suitable size or length to support any desired number of shelf portions 130, which may be more than sixteen or less than sixteen. In addition, in one or more examples of embodiments, any desired or suitable number of self portions 130 may be provided on tower assembly 100. For example, a desk top arrangement of tower assembly 100 having fewer than sixteen shelf portions 130 may be provided, wherein the tower assembly 100 is free standing or includes a support base, for positioning on a desk, table, shelf, or any other desired structure. The tower assembly components may be constructed of powder coated aluminum, injection molded plastic or any other suitable structure. In addition, the tower assembly may be customized with one or more different colors including school colors, identifying business colors, etc.

Figure 6:
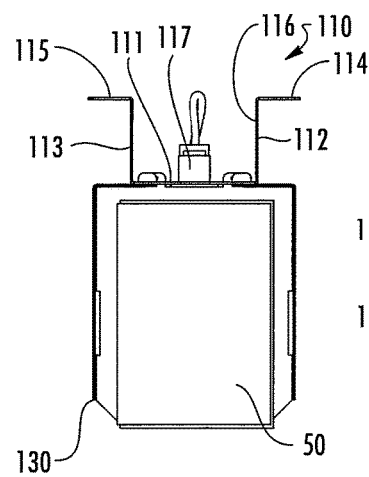
FIG. 6 is a top down plan view of one or more examples of embodiments of a storage and charging station system for portable electronic devices illustrating a power supply mounted in the channel of the tower support.

Referring now to FIGS. 1 and 6, support portion 110 may include a first support member or portion 111, a second support member or portion 112, and a third support member or portion 113. More specifically, first member 111 may be coupled to second member 112, and first member 111 may be coupled to third member 113. Preferably, second and third members 112, 113 are provided at an angle to first member 111 to define a cable management channel 116 and may consist of a single unitary sheet bent or formed into a single channel shape. As such, channel 116 is defined by first, second, and third members 111, 112, 113. Channel 116 is provided on the side of first member 113 opposite the plurality of shelf portions 130. As illustrated in FIGS. 1 and 6, second and third members 112, 113 may be provided parallel to one another, and further provided approximately perpendicular to first member 111. However, in one or more examples of embodiments, second and third members 112, 113 may be provided at any suitable angle to first member 111 to define channel 116. First, second, and third members 111, 112, 113 may be formed of a unitary pressed, bent or molded material. However, it should be appreciated that in one or more examples of embodiments, first, second, and third members 111, 112, 113 may be two or more pieces coupled together, for example by weld.

Support portion 110 may also include a first wall engaging tab or fourth support member or portion 114 and a second wall engaging tab or fifth support member or portion 115. First wall engaging tab 114 may be coupled to second member 112, while second wall engaging tab 115 may be coupled to third member 113. Wall engaging tabs 114, 115 may be provided approximately planar to one another to facilitate coupling to a flat surface, such as a wall. In addition, wall engaging tabs 114, 115 may be provided approximately parallel to first member 111. In addition, wall engaging tabs 114, 115 may be provided at an angle to second and third members 112, 113. For example, as illustrated, wall engaging tabs 114, 115 may be provided approximately perpendicular to second and third members 112, 113. As illustrated in FIG. 3, wall engaging tabs 114, 115 may each include one or more mounting apertures 122 adapted to receive a mounting member (not shown), such as a screw, nail, or any other suitable mounting device. Mounting member may be used to mount assembly 100 to a surface, such as a wall. First, second, and third members 111, 112, 113 and wall engaging tabs 114, 115 may be formed of a unitary material. However, it should be appreciated that in one or more examples of embodiments, first, second, and third members 111, 112, 113 and wall engaging tabs 114, 115 may be two or more pieces coupled together, for example by weld.

Figures 4, 5:
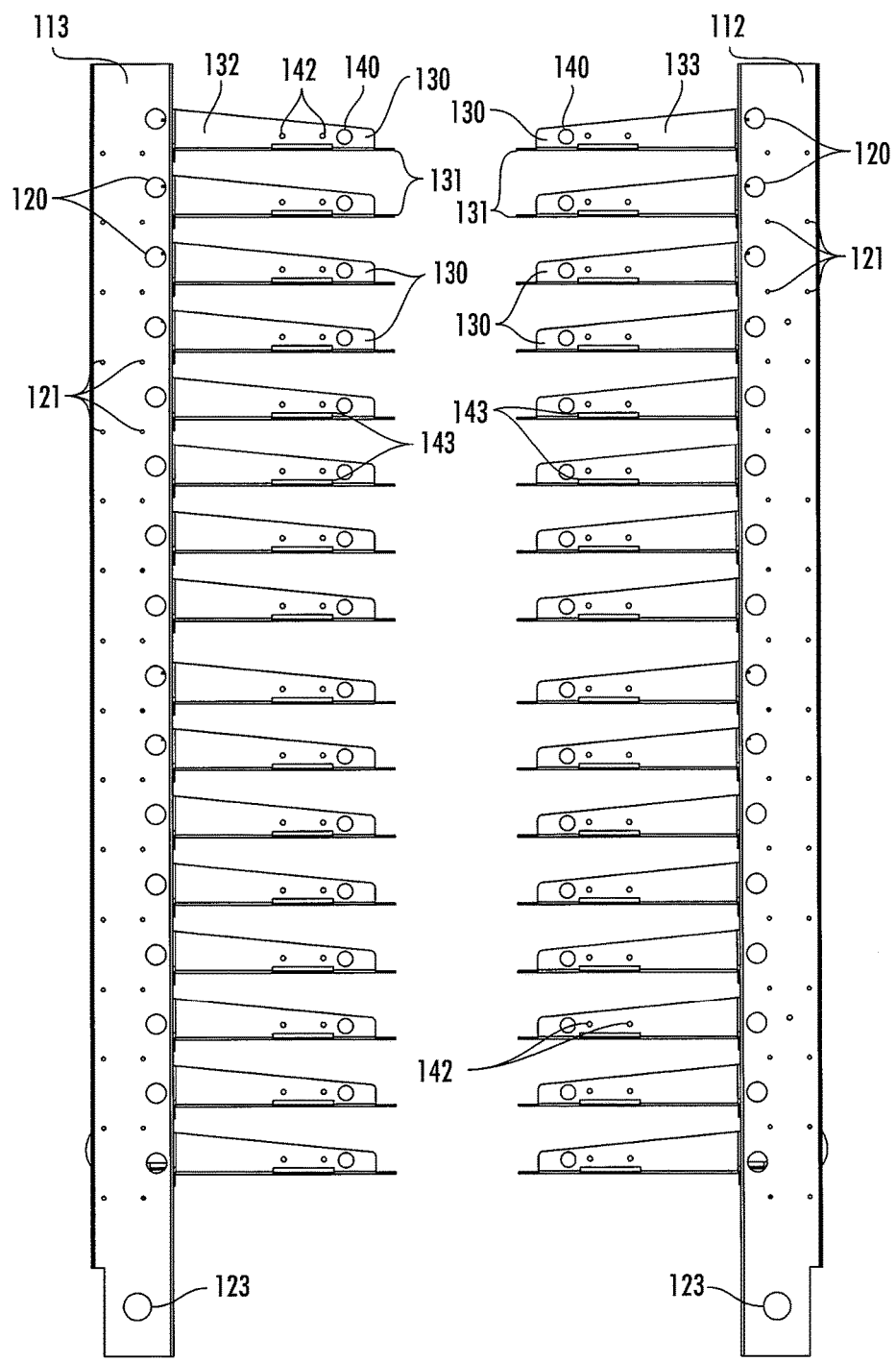
FIG. 4 is a first side elevation view of the storage and charging station system of FIG. 1, taken along line 4-4 of FIG. 2.
FIG. 5 is a second side elevation view of the storage and charging station system of FIG. 1, taken along line 5-5 of FIG. 2.

Referring now to FIGS. 4 and 5, each of the plurality of shelf portions 130 may include a bottom portion 131, a first edge portion 132, and a second edge portion 133. Referring to FIG. 2, each shelf portion 130 may also include a first back tab 134 and a second back tab 135, which back tabs may each be formed from a portion of the bottom portion 131, or from a portion of the adjacent first edge portion 132 or second edge portion 133, as shown in FIG. 2. Alternatively, a single back tab could extend across all or a portion of the back margin of the shelf 130. First edge portion 132, second edge portion 133, first back tab 134, and second back tab 135 generally surround a portion of the perimeter of bottom portion 131 and define a storage bay for an electronic device. In addition, first and second edge portions 132, 133, and first and second back tabs 134, 135 may be provided approximately perpendicular to the plane of bottom portion 131. As such, first and second edge portions 132, 133, and first and second back tabs 134, 135 may assist in the retention of a portable electrical device in the storage bay by forming a portion of the perimeter of bottom portion 131.

Referring back to FIGS. 4 and 5, first and second edge portions 132, 133 may have a tapered height as shown. As first and second edge portions 132, 133 extend away from back tabs 134, 135, the height of first and second edge portions 132, 133, as measured by a distance perpendicular to bottom portion 131, decreases. Stated otherwise, the edge of first and second edge portions 132, 133 furthest away from bottom portion 131 has a negative slope from an edge closest to back tabs 134, 135 to an edge furthest away from back tabs 134, 135. The decreasing slope or decreasing height creates sufficient open area to allow for a user to quickly and accurately identify, confirm, and/or inventory electronic devices stored in the storage bay of each shelf portion 130.

Referring to FIGS. 2 and 3, each of the plurality of shelf portions 130 may include one or more retaining tabs 136. Retaining tabs 136 may project away from bottom portion 131. In addition, retaining tabs 136 are preferably parallel to bottom portion 131. Each of the plurality of shelf portions 130 may also include one or more retaining hooks 137. A retaining hook 137 may be respectively coupled to first and second back tabs 134, 135. Retaining hooks 137 preferably project away from first and second back tabs 134, 135. Further, retaining hooks 137 are preferably parallel to bottom portion 131. Each retaining hook 137 may include a laterally projecting hook portion 137a defining a shallow channel between the hook portion and the rear surface of the back tab 134 or 135 from which the hook projects. Each of the plurality of shelf portions 130 may also include one or more retaining apertures 138. A retaining aperture 138 may be provided in each of the first and second back tabs 134, 135. Retaining apertures 138 may be aligned with a corresponding shelf attachment member aperture 122 provided in first member 111 of tower support 110.

The plurality of shelf portions 130 may be removably attached or coupled to mounting support portion 110. The removability and/or additive nature of shelf portions 130 provides expandability for the addition or removal of one or more shelf portions 130. In addition, the location of shelf portions 130 may be customized based upon the heights of the users. For example, in end uses where users may be shorter, such as a primary school setting, shelf portions 130 may be provided at lower locations of tower support 110 to correspond for the relatively shorter heights of the users. Similarly, in end uses where users may be taller, such as a secondary school setting, shelf portions 130 may be provided at higher locations of tower support 110 to correspond for the relatively taller heights of the users.

Referring now to FIGS. 2 and 3, the retaining tabs 136 of each shelf portion 130 are removably received by a respective first shelf receiving slot 119a provided in mounting support portion 110. Preferably, first shelf receiving slots 119a are provided through first member 111. In addition, each retaining hook 137 of each shelf portion 130 is removably received by a respective second shelf receiving slot 119b provided in mounting support portion 110. Preferably, second shelf receiving slots 119b are also provided through first member 111. When each shelf portion 130 is engaged with first member 111, each retaining tab 136 is received by an associated first shelf receiving slot 119a, while each retaining hook 137 is received by an associated second shelf receiving slot 119b. In addition, the channel defined by the hook portion 137a of each retaining hook 137 receives a portion of first member 111. More specifically, a portion of the hook 137 is received by second shelf receiving slot 119b such that an end edge portion of the slot 119b defined by the first member 111 is received within the channel defined by the hook portion 137a of each retaining hook 137. To further facilitate engagement and retention of shelf portions 130 to mounting support portion 110, the first and second back tabs 134, 135 of each shelf portion 130 may have a bias. The bias preferably is in a direction to encourage the first member 111 to be received within the channel defined by the hook portion 137a and engage each retaining hook 137 upon receipt of each retaining hook 137 by the associated second shelf receiving slot 119b.

Figure 2A:
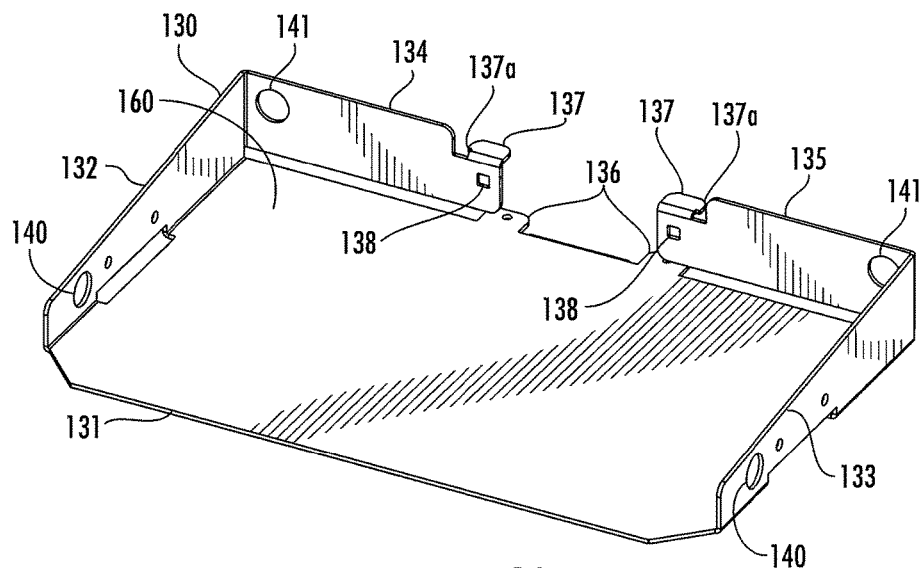
FIG. 2A is an isometric view of an example of an embodiment of a shelf portion which may be attached to a tower support of the storage and charging station system of FIG. 1.
Figure 2B:
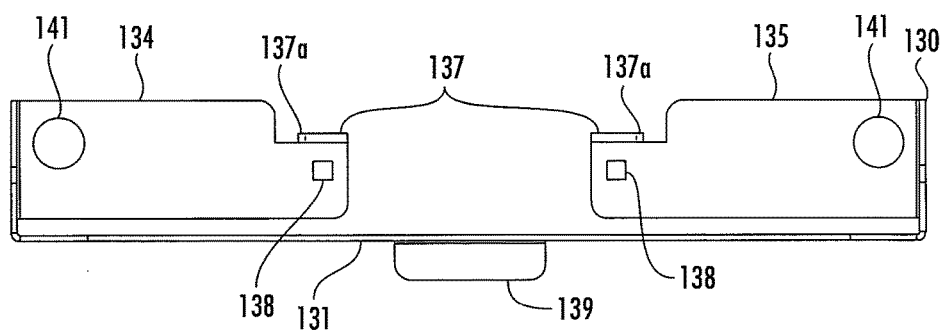
FIG. 2B is a front view of the shelf portion of FIG. 2A.

As best illustrated in FIGS. 2A and 2B, in an exemplary embodiment the first edge portion 132 is integrally formed with and at an approximately right angle to a first side of the bottom portion 131, while the back tab 134 is integrally formed with and at an approximately right angle to the first edge portion, such that the first edge portion 132 extends upwardly from a side of the bottom portion 131, and the back tab 134 extends from the back end of the first edge portion 132 generally parallel to the back edge of the bottom portion 131. The first edge portion 132 thus has a vertical bias which positions the retaining hook a fixed distance from the first side of the bottom portion 131. The second edge portion 133, back tab 135 and attached retaining hook 137 are likewise attached to the opposite second side of the bottom portion 131 and each other to likewise position the attached retaining hook a fixed distance from the second side of the bottom portion. The retaining hooks are thus seen to have a structural bias toward fixed spaced positions above the back edge of the bottom portion 131. To facilitate connection of a shelf portion 130 to the first member 111, it can be seen that the side edge portions 132 and 133 may be manually flexed toward each other to reduce the distance between the retaining hooks 137 and to permit the retaining hooks to be inserted into the second shelf retaining slots 119b in the first member. The outer margins of the retaining slots 119b are more closely spaced from each other than the distal margins of the hooks, so that when the manual flexing force on the edge portions 132 and 133 is released, the structural bias of the shelf portions will pull the retaining hooks apart and the end edge portions of the receiving slots 119b will be received and engaged in the channels defined by the retaining hook portions 137a to retain the shelf portion 130 on the first member 111. In an exemplary embodiment a support flange 139, best shown in FIG. 2B, may be unitarily formed with the shelf portion 130 and extend downwardly from the back edge of the bottom portion 131 a desired distance to provide additional support and resistance to downward bending of the retained shelf portion. In addition, shelf portions 130 may be coupled to mounting support portion 110 with a retaining member (not shown). A suitable retaining member may include, but is not limited to, a screw, bolt, pin, or any other suitable removable engagement member. A retaining member may be received by one or more retaining apertures 138, and the corresponding shelf attachment member aperture 122 aligned with each retaining aperture 138. While a particular advantageous engagement structure has been illustrated and described for mounting a shelf portion on the first member 111 such that any single shelf member may be attached to or detached from a mounting support assembly without interference with any other mounted shelf portion, it should be understood that any mechanical connection of shelf portions to support assembly is contemplated within the spirit of the invention.

Tower assembly 100 may also include a cable management system. The cable management system may include cable management channel 116, which may be provided in assembly 100 to assist in the management of any cables, such as cables provided for supplying power to one or more electronic devices, cables provided for the exchange of data with one or more electronic devices, or any other associated cable to be coupled to one or more electronic device while stored in storage bays 160. Referring to FIGS. 1 and 3, channel 116 may extend vertical along the majority of mounting support portion 110, up to and including the entirety of the vertical structure of mounting support portion 110. Referring now to FIGS. 4 and 5, channel 116 may include a first cable support aperture 120 provided in second member 112 or third member 113. As illustrated, both second and third members 112, 113 each have a first cable aperture or first cable aperture 120 which corresponds to each shelf portion 130. As such, second and third members 112, 113 each have a plurality of cable apertures 120 which extend along second and third members 112, 113, respectively. The plurality of cable apertures 120 may be provided vertically along second and third members 112, 113 and may be provided in approximately vertical alignment. Channel 116 may also include a plurality of second cable apertures 121 provided in second member 112 or third member 113. As illustrated, both second and third members 112, 113 each have a pair of appropriately sized second cable apertures 121 which corresponds to each shelf portion 130. As such, second and third members 112, 113 may each have a plurality of second cable aperture 121 pairs which correspond to each shelf portion 130. The plurality of second cable aperture 121 pairs may be provided vertically along second and third members 112, 113 and may be provided in approximately vertical alignment. In addition, channel 116 may include one or more master or third cable apertures 123 provided in second member 112 and/or third member 113.

Third cable apertures 123 may be provided to allow one or more supply cables, for example, but not limited to, a main power cable and/or main communication cable, entry into channel 116. The second cable apertures 121 may have a diameter which is less than first and third cable support apertures 120, 123. In addition the third cable apertures 123 may have a diameter which is greater than first and second cable apertures 120, 121. In one or more examples of embodiments, channel 116 may have a polygonal, arcuate, tubular, rounded, or any other desired or suitable cross-sectional shape suitable to manage one or more cables.

The cable management system may also include one or more shelf apertures 140, 141 provided in each shelf portion 130. Referring to FIGS. 4 and 5, at least one first shelf aperture 140 may be provided in first or second edge portions 132, 133. As illustrated, at least one first shelf aperture 140 may be provided in each of first edge portion 132 and second edge portion 133, respectively. First shelf apertures 140 provided in first and second edge portions 132, 133 may be in lateral or horizontal alignment and separated by bottom portion 131. However, in one or more examples of embodiments, first shelf apertures 140 provided in first and second edge portions 132, 133 may not be in alignment and otherwise may be provided in any desired location along the respective first or second edge portion 132, 133. Referring to FIG. 2, at least one second shelf aperture 131 may be provided in first or second back tabs 134, 135. As illustrated, at least one second shelf aperture 141 may be provided in each of first back tab 134 and second back tab 135, respectively. Second shelf apertures 141 provided in first and second back tabs 134, 135 may be in lateral or horizontal alignment. However, in one or more examples of embodiments, second shelf apertures 141 provided in first and second back tabs 134, 135 may not be in alignment and otherwise may be provided in any desired location along the respective first or second back tabs 134, 135. Generally, second shelf apertures 141 are provided in a different plane than first shelf apertures 140. As illustrated, second shelf apertures 141 may be provided in a plane orthogonal to the plane first shelf apertures 140 are provided in. In addition, second shelf apertures 141 are generally provided at a location in each respective first and second back tabs 134, 135 which is not in alignment or is not overlapping or otherwise is offset from first member 111 of tower support 110. This allow one or more cables to extend from channel 116 through one or more of the second shelf apertures 141 of each shelf portion 130.

Referring back to FIGS. 4 and 5, a plurality of third shelf apertures 142 may be provided in first or second edge portions 132, 133. As illustrated, at least two third shelf apertures 142 may be provided in first edge portion 132 and second edge portion 133, respectively. Third shelf apertures 142 provided in first and second edge portions 132, 133 may be in lateral or horizontal alignment along each edge portion 132, 133. In addition, each pair of third shelf apertures may be in lateral or horizontal alignment and separated by bottom portion 131. However, in one or more examples of embodiments, third shelf apertures 142 provided in first and second edge portions 132, 133 may not be in alignment and otherwise may be provided in any desired location along the respective first or second edge portion 132, 133. Generally, third shelf apertures 142 may have a diameter which is less than first and second shelf apertures 140, 141.

In operation and use of the cable management system, one or more cables may enter into channel 116 through third cable aperture(s) 123. The cables may then extend along channel 116. One or more cables may exit channel 116 to each respective shelf portion 130 through one or more of first cable support aperture(s) 120. After exiting channel 116, one or more cables may extend to each shelf portion 130 through one or more of first and second shelf aperture(s) 140, 141. Whether to use one or more of first and second shelf aperture(s) 140, 141 depends upon a number of factors, including, but not limited to, the number of cables extending outward from channel 116 to each shelf portion 130, the location of a power adaptor for charging an electronic device within the electronic device, and/or the location of a communication adaptor within the electronic device for communicating with the electronic device. The plurality of first and second shelf aperture(s) 140, 141 advantageously provide alternatives for extending one or more cords from channel 116 to electrically connect to the electronic device(s) stored in each shelf portion 130. This will accommodate different types, configurations, and/or brands of electronic devices which may have different locations for various ports which would receive one or more cables. It should be appreciated in one or more examples of embodiments that more than one device may be stored in each shelf portion. In addition, more than one type or brand of device may be stored in any one shelf portion, including two or more different types or brands of device in a single shelf portion at the same time. In addition, more than one type or brand of device may be stored simultaneously in separate shelf portions of a single assembly.

In addition, second cable apertures 121 and third shelf apertures 142 may be provided to assist in coupling or restraining various add on hardware components associated with the electronic devices. For example, chargers for electronic devices typically have a power supply, which may be sizeable. Second cable apertures 121 and/or third shelf apertures 142 provide a location in which these components may be coupled to the respective channel 116, second member 112, third member 113, and/or shelf portion 130. Second cable apertures 121 and/or third shelf apertures 142 may receive a connecting member, for example, but not limited to, a zip tie, twist tie, or other attachment apparatus. This will allow for one or more hardware components associated with each electronic device to be coupled to assembly 100. In one or more examples of embodiments, one or more of the disclosed apertures of the cable management system may be used to receive one or more data distribution cables. A data distribution cable may include, but is not limited to, a USB cable, mini-USB cable, Firewire, CAT-5, CAT-6, or any other known or future developed structure or material which communicates or transfers data. A plurality of data distribution cables may be incorporated into the cable management system to create data links with one or more portable device(s) stored in the tower assembly. This advantageously allows for the wired transfer and/or distribution of data to or from one or more data source(s) from or to one or more portable device(s) stored in the tower assembly. In addition, in one or more examples of embodiments, one or more portable device(s) stored in the tower assembly may be in wireless communication with one or more data source(s) to allow for the wireless transfer and/or distribution of data to or from one or more data source(s) from or to one or more portable device(s) stored in the tower assembly.

Figure 7:
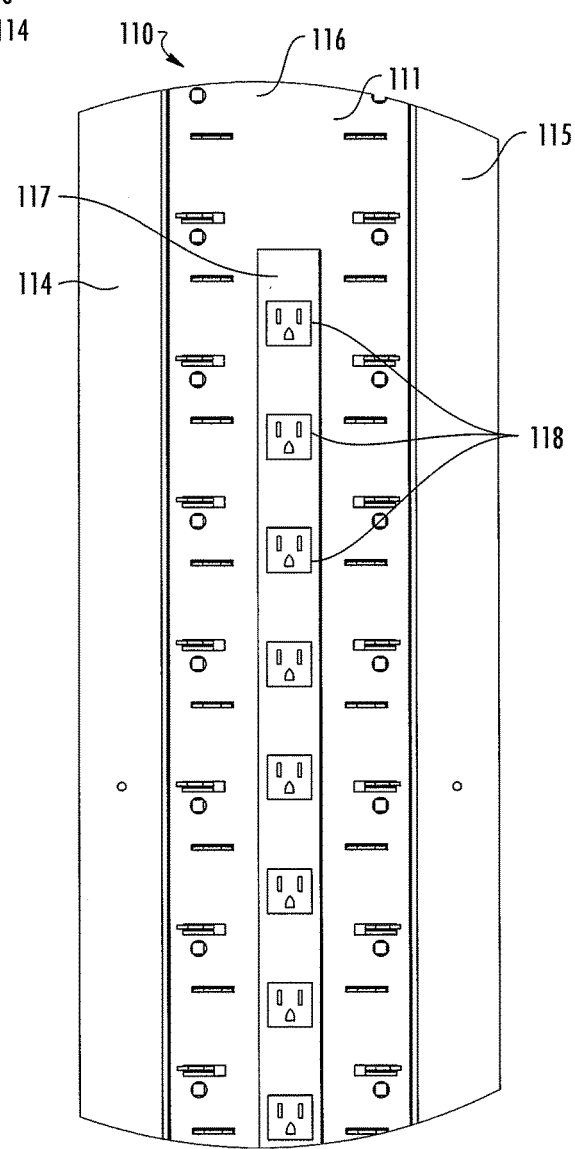
FIG. 7 is a partial rear elevation view of the storage and charging station system of FIG. 6.
Figure 8:
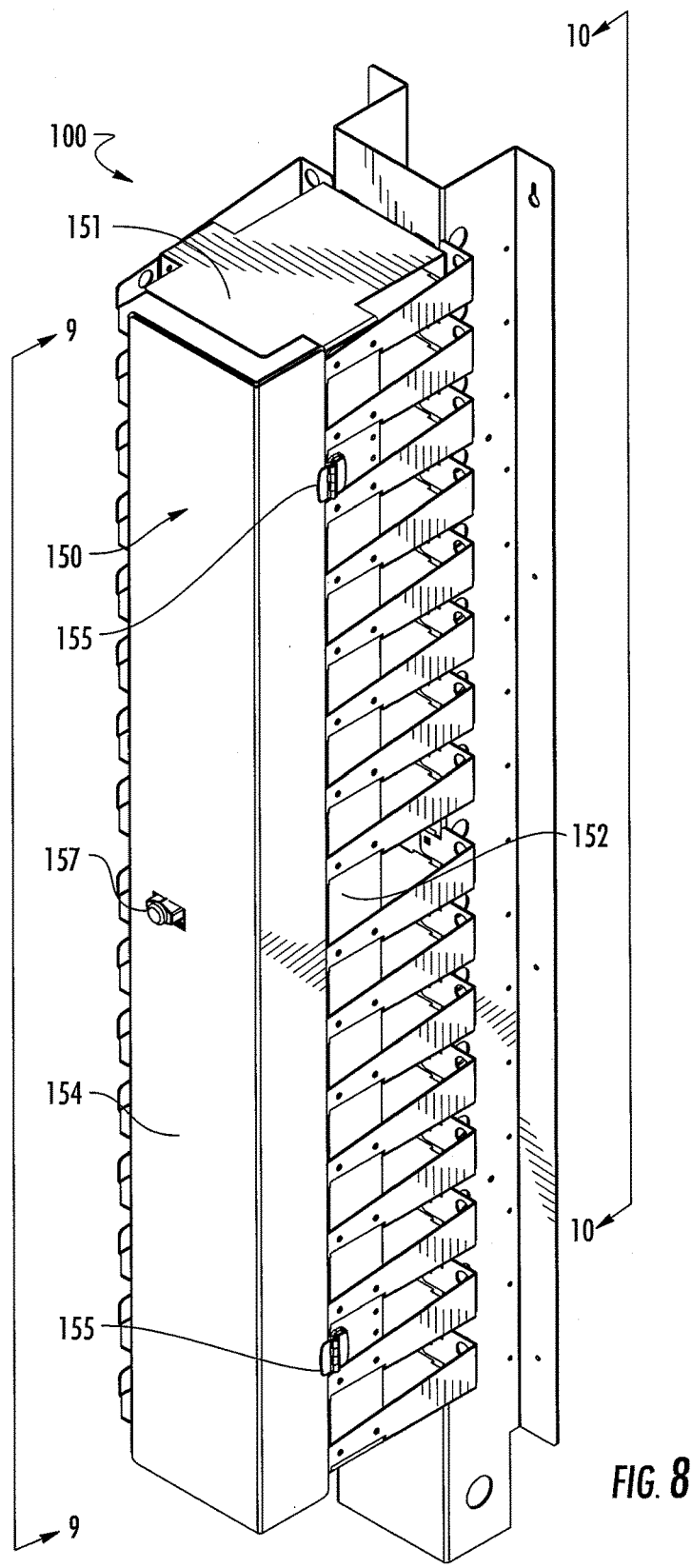
FIG. 8 is an isometric view of one or more examples of embodiments of a storage and charging station system for portable electronic devices incorporating a locking assembly.
Figures 11, 12:
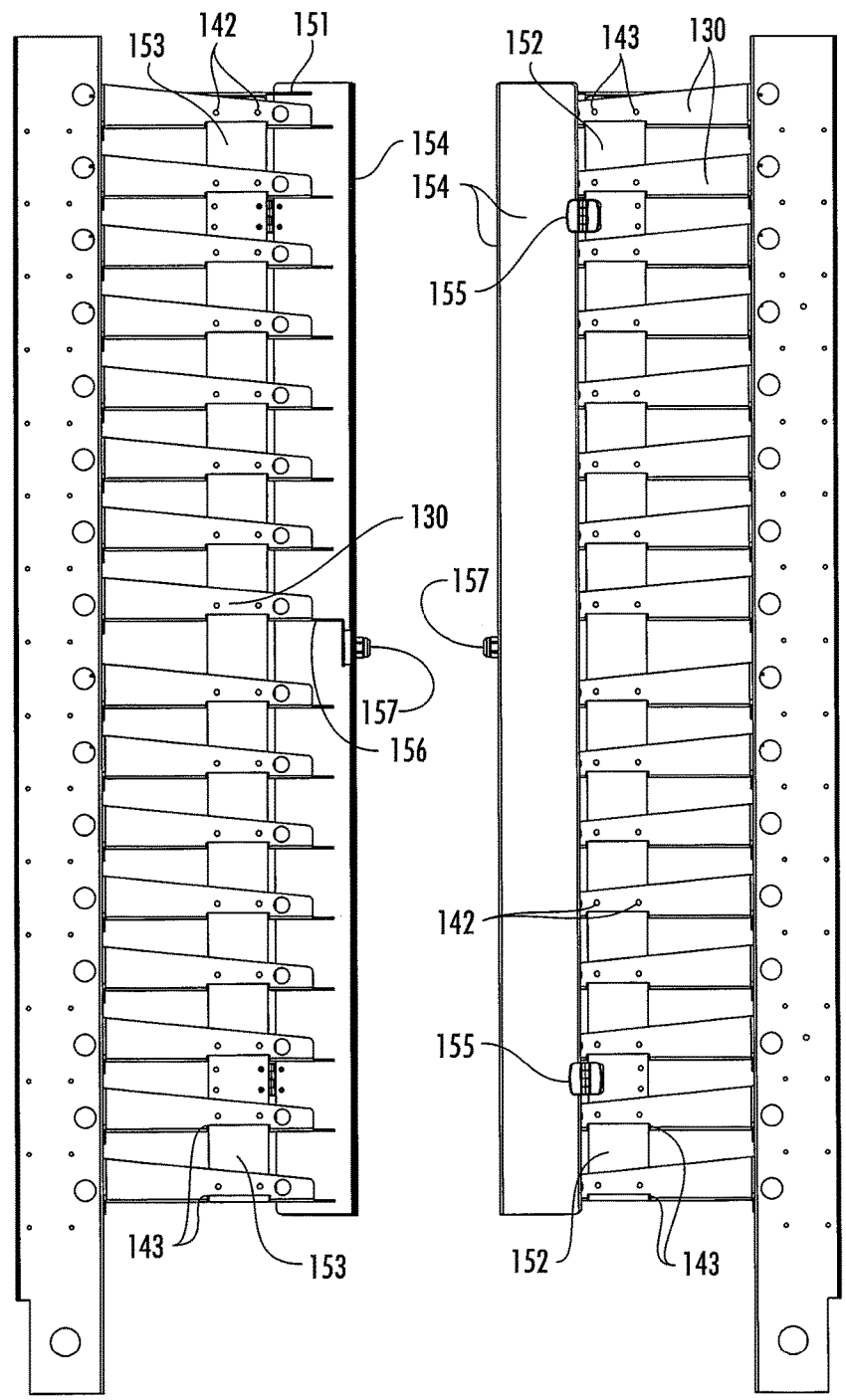
FIG. 11 is a first side elevation view of the storage and charging station system of FIG. 8, taken along line 11-11 of FIG. 9.
FIG. 12 is a second side elevation view of the storage and charging station system of FIG. 8, taken along line 12-12 of FIG. 9.

FIGS. 6 and 7 illustrate one or more examples of embodiments of assembly 100 incorporating a power supply or power strip or power distribution strip 117 into channel 116. Power strip 117 may be provided in channel 116. In addition, power strip 117 may be coupled to first member 111. Power distribution strip 117 may distribute electricity to a plurality of outlets 118 provided within the strip. The number of outlets generally corresponds to at least the number of shelf portions 130 which may be coupled to or available to be coupled to mounting support portion 110. In addition, the power strip may be provided with one power inlet. This advantageously allows for the power strip to use and/or occupy only a single power receptacle. It should be appreciated that mat type chargers, which may re-charge an electronic device by placement of the electronic device onto the mat, may be utilized by assembly 100. Specifically, one or more mat type chargers may be provided in each storage bay 160 on each bottom portion 131 within each shelf portion 130. Examples of commercially available mat type chargers include POWERMAT brand wireless battery chargers sold by Powermat Ltd. of Neve Ilan, Israel.

FIGS. 4 and 5 illustrate one or more locking slots 143 provided in each shelf portion 130. Locking slots 143 may be provided between first edge portion 132 and bottom portion 131, and between second edge portion 133 and bottom portion 131. Slots 143 may be any suitable or desirable length, shape, or size, and may be respectively defined by the removal of a portion of each edge portion 132, 133 and/or associated bottom portion 131. Slots 143 may be adapted to receive a portion of a locking assembly to lock or assist in restricting access to one or more electronic devices stored in each shelf portion 130.

FIGS. 8-12 illustrate tower assembly 100 incorporating one or more examples of embodiments of a locking assembly 150. Locking assembly 150 may include a first sidewall or top sidewall 151 which is provided over a portion of the top most shelf portion 130. Preferably, top sidewall 151 preferably is of a size to limit access and/or removal of an electronic device stored in the top most shelf portion 130. As such, top sidewall 151 may cover or overlap the entire storage bay 160 or may cover or overlap less than the entirety of storage bay 160. Top sidewall 151 may be coupled or integrally connected to opposing second and third outer sidewalls 152, 153. Sidewalls 152, 153 may extend vertically from the top sidewall 151 through locking slots 143 of each shelf portion 130. Sidewalls 152, 153 have a width, as measured along the edge portions 132, 133, sufficient to limit access and/or removal of electronic devices stored in each shelf portion 130 along the edge portions 132, 133. Sidewalls 152, 153 extend from the top most shelf portion 130 to the bottom most shelf portion 130. At the bottom most shelf portion 130, each sidewall 152, 153 may be coupled to the bottom most shelf portion 130. In addition, each sidewall 152, 153 may be coupled to each shelf portion through third shelf apertures 142. For example, each sidewall 152, 153 may be welded, bolted, pinned, or otherwise connected to each shelf portion 130 through third shelf apertures 142. Door 154 may be pivotably connected to either sidewall 152, 153. As illustrated, door 154 is pivotably connected to sidewall 152 by a plurality of hinge members 155. Door 154 pivots about hinge members 155 to provide access to the shelf portions 130 and associated electronic devices stored therein. Door 154 is selectively coupled to a locking member 156 by a locking handle 157. Locking member 156 may be coupled to or otherwise attached to one of the shelf portions 130. Preferably, locking member 156 is permanently attached, such as by weld, to a bottom portion 131 of at least one shelf portion 130. The locking member 156 extends from the associated shelf portion 130 towards door 154. Locking member 156 has locking handle 157 at an end closest to door 154. Locking handle 157 is adapted to engage door 154 to enable engagement and locking of door 154 to locking member 156. This facilitates selective opening, closing, and locking of door 154 in order to limit access to one or more electronic devices stored within each associated shelf portion 130. The locking assembly 150 advantageously provides safeguards limiting the unauthorized removal or taking of one or more electronic devices from assembly 100 while also providing sufficient open space between each of the shelf portions 130 and the locking assembly 150 to allow a user to visually inventory the electronic devices stored in assembly 100 while the locking assembly 150 is in a locked position. In one or more examples of embodiments, a plurality of doors 154 may be pivotably connected to the sidewalls 152, 153. For example, a first door 154 may be pivotably connected to sidewall 152, while a second door 154 may be pivotably connected to sidewall 153.

Figure 13:
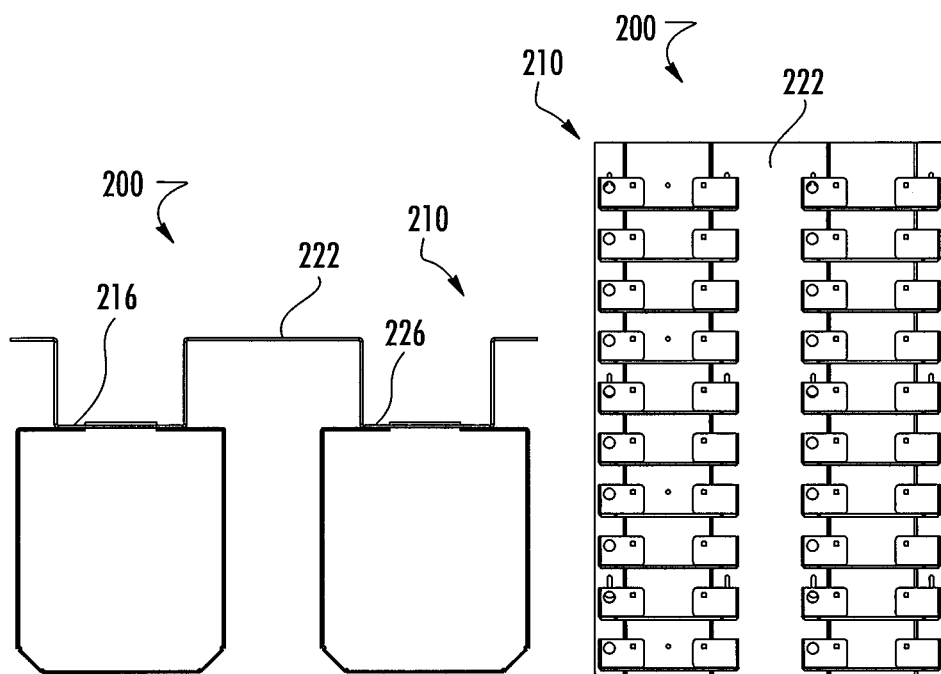
FIG. 13 is a top down view of one or more examples of embodiments of a storage and charging station system for portable electronic devices, wherein the system includes multiple rows of vertically spaced shelves.
Figure 14:
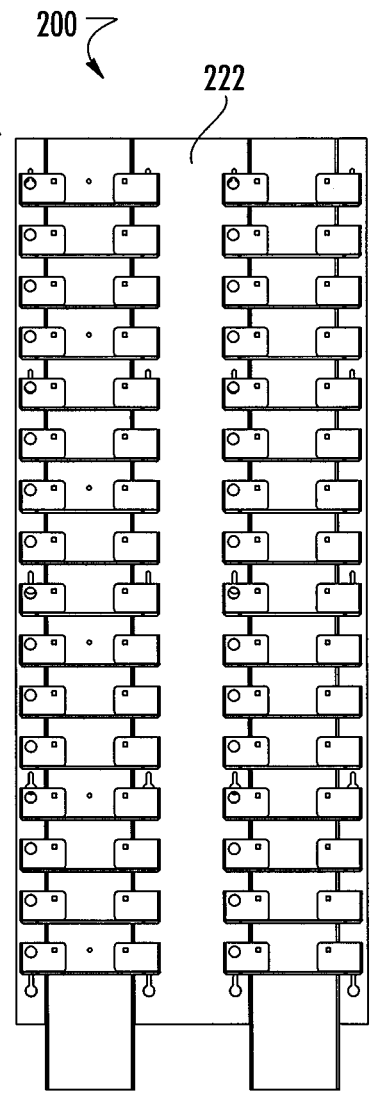
FIG. 14 is a front elevation view the storage and charging station system of FIG. 13.

FIGS. 13-14 illustrate an alternative example of an embodiment of a tower assembly 100. More specifically, FIGS. 13-14 illustrate a double wall unit tower assembly 200. Particular components described herein are substantially the same and like numbers have been used to illustrate the like components. Referring to FIGS. 13-14, double wall unit tower assembly 200 includes a double mount support portion 210. Double mount support portion 210 includes a dual channel arrangement for supporting a plurality of shelf portions 130 provided in two, side by side, stacked, vertical rows. As illustrated, double mount support portion 210 includes a first channel 216 and a second channel 226. The first and second channels 216, 226 are substantially identical to channel 116, other than channels 216, 226 are connected by member 222.

Figure 15:
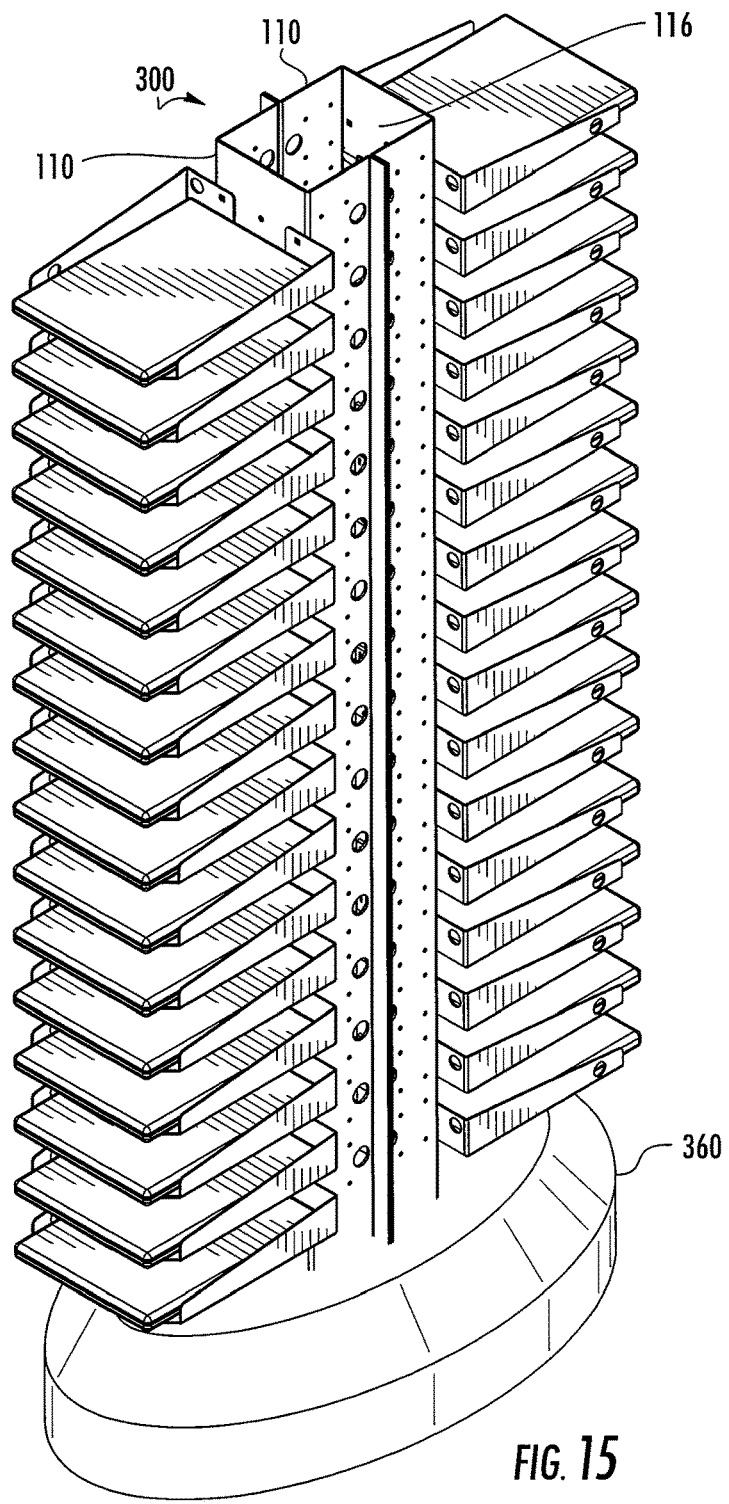
FIG. 15 is an isometric view of one or more examples of embodiments of a storage and charging station system for portable electronic devices, wherein the system includes multiple rows of vertically spaced shelves and a semi-static base.

FIG. 15 illustrates an alternative embodiment of a tower assembly 100. More specifically, FIG. 15 illustrates a double unit back to back tower assembly 300 having a semi-static base 360. Particular components described herein are substantially the same and like numbers have been used to illustrate the like components. Tower assembly 300 is made of two opposing tower supports 110, wherein the respective channel portions 116 are coupled or combined to form a single central channel.

Figure 16:
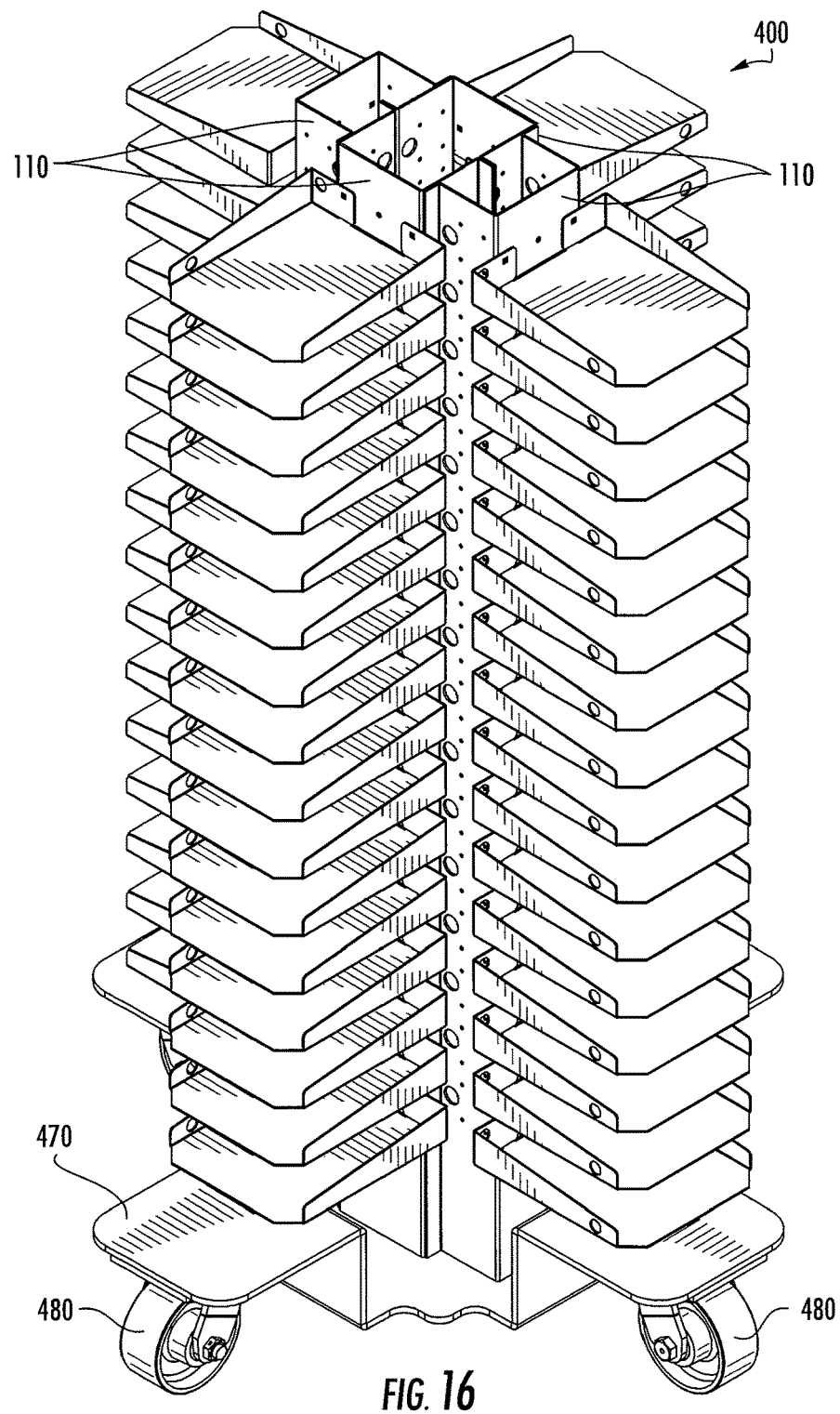
FIG. 16 is an isometric view of one or more examples of embodiments of a storage and charging station system for portable electronic devices, wherein the system includes multiple rows of vertically spaced shelves and a mobile base.

FIG. 16 illustrates an alternative embodiment of a tower assembly 100. More specifically, FIG. 16 illustrates a quad unit tower assembly 400 which is mobile by being provided on a base 470 having wheels or casters 480 attached thereto. Particular components described herein are substantially the same and like numbers have been used to illustrate the like components. Tower assembly 400 is made of four separate tower supports 110 connected together, wherein the respective channel portions 116 are combined to form three separate central channels.

Figure 17:
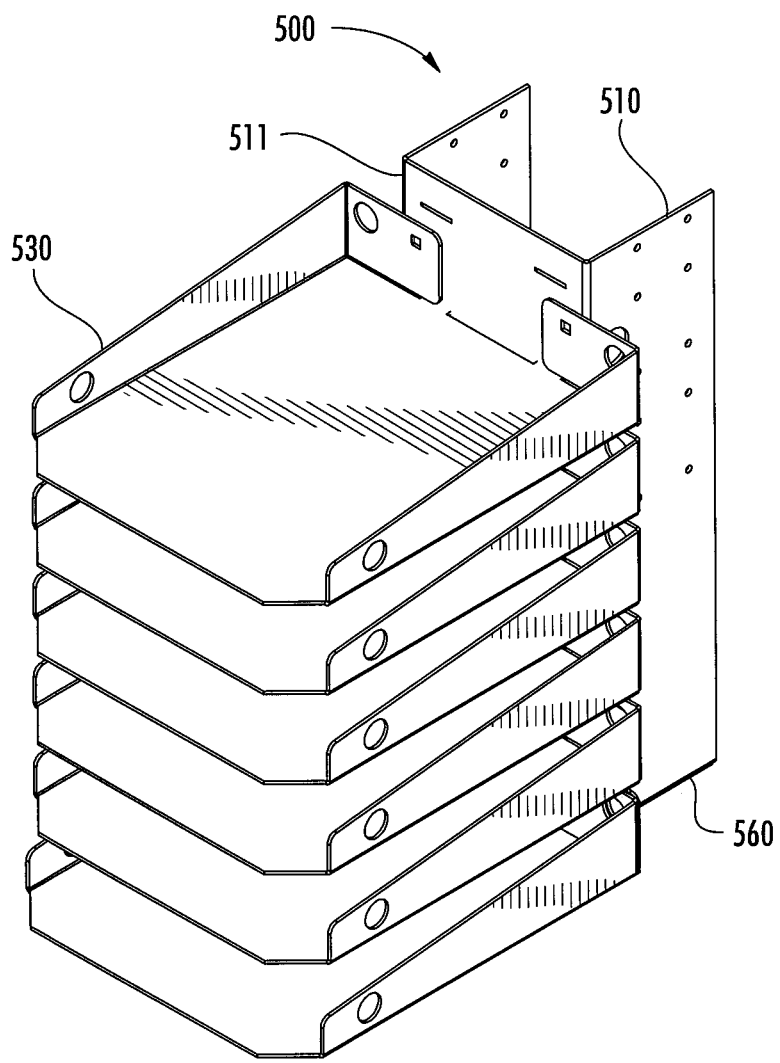
FIG. 17 is an isometric view of one or more examples of embodiments of a counter top storage and charging system for portable electronic devices, wherein the system includes a plurality of vertically spaced shelves.
Figure 18:
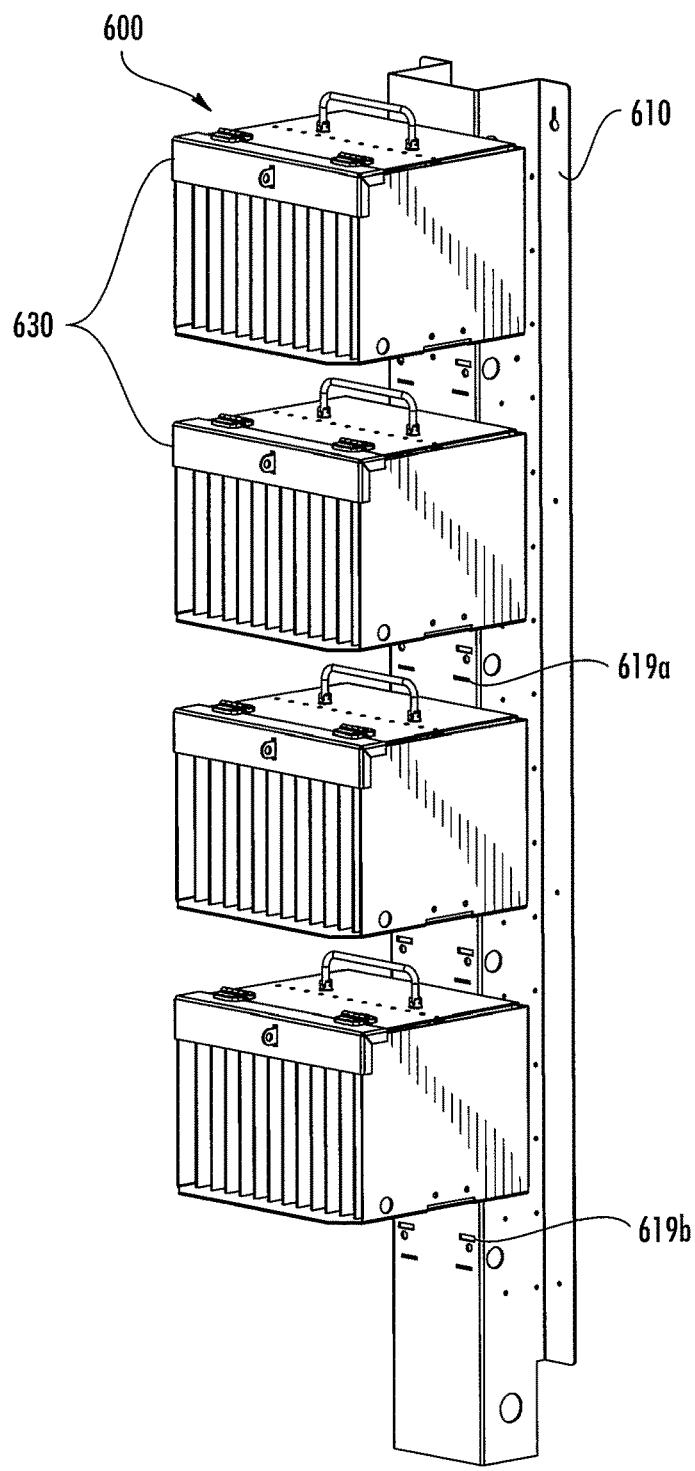
FIG. 18 is an isometric view of one or more examples of embodiments of a plurality of portable carrier storage and charging assemblies, each carrier being adapted to contain a plurality of portable electronic devices, which assemblies are detachably mounted on a tower assembly of the invention.
Figure 19:
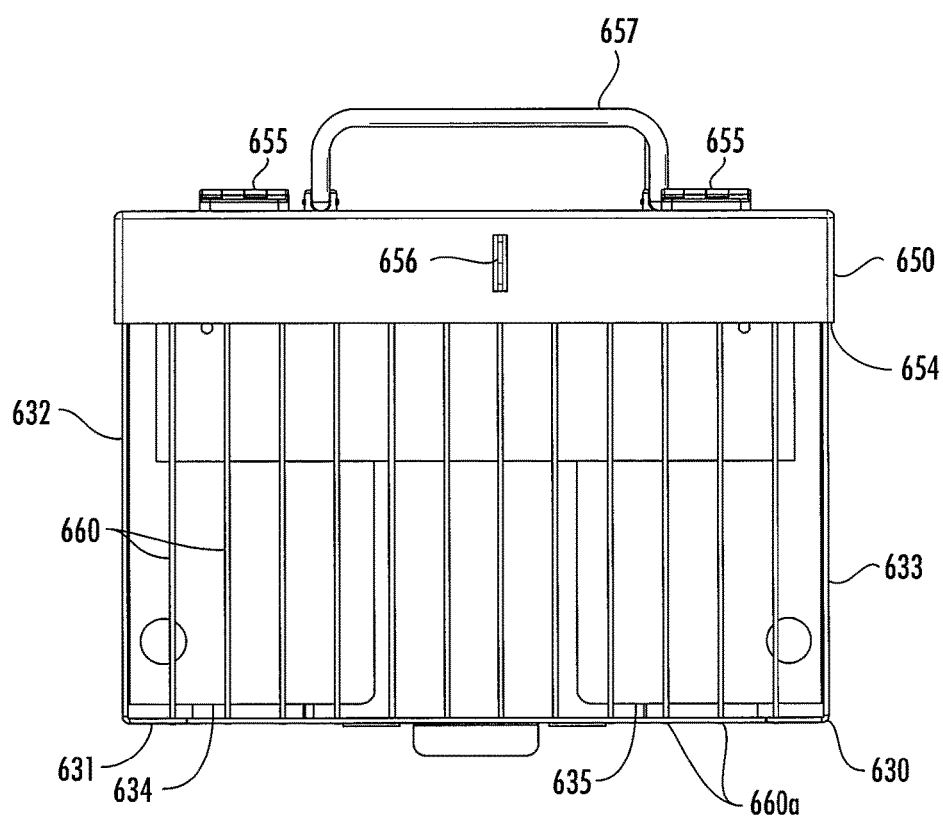
FIG. 19 is a front elevation view of a portable carrier storage and charging assembly of FIG. 18 detached from a tower assembly.

FIG. 17 schematically illustrates an alternative embodiment of a counter top assembly of a storage and charging station system for portable electronic devices. More specifically, FIG. 17 illustrates a counter top assembly 500 which may be located on a counter top, desktop, shelf or any other convenient horizontal support surface. A base is provided which includes a vertical channel support member 510 having a horizontal base 560 suitable for sitting or mounting on a support surface, and a plurality of shelf portions 530 attached in spaced vertical relation to the channel support member 510. Particular components described herein may be substantially the same as similarly functioning components previously described herein and like numbers have been used to illustrate the like components. The channel support member 510 includes a first member 511 which may be fabricated to support the shelf portions 130, 530 in the same manner as previously described first member 111. Likewise, other equivalent attachment means may be provided on the shelf portions 530 and the first member 511 to detachably secure the shelf portions 530 to the channel support member 510 in vertically spaced relation for convenience of use. The channel support member 510 can be provided with a properly sized power distribution strip (not shown) of the same type illustrated and described above, or any other suitable available or future developed multiple outlet power source. Likewise, mat type chargers as previously described may be provided. A rear cover plate (not shown) and/or top cover plate (not shown) of any suitable configuration may be provided for the channel support chamber 510 if desired.

FIGS. 18-21 illustrate examples of an alternative embodiment of a storage and charging station system 600, which includes a plurality of modular portable carrier storage and charging assemblies 630 detachably mounted on a support portion 610, which may be substantially similar in structure to support portion 110 or other support portions previously described. Each portable carrier assembly 630 is independently attachable to and detachable from support portion 610 in the same general manner as shelf portions 130. Similar attachment structure and multiples thereof may be provided on each portable carrier assembly as on previously described shelf portions 130, and such attachment structures can be spaced to fit respectively similarly spaced first shelf retaining slots 619a and 619b. Likewise, support structure 610 may be slotted to receive and support previously illustrated and described shelf portions 130 in vertically spaced array.

Figure 20:
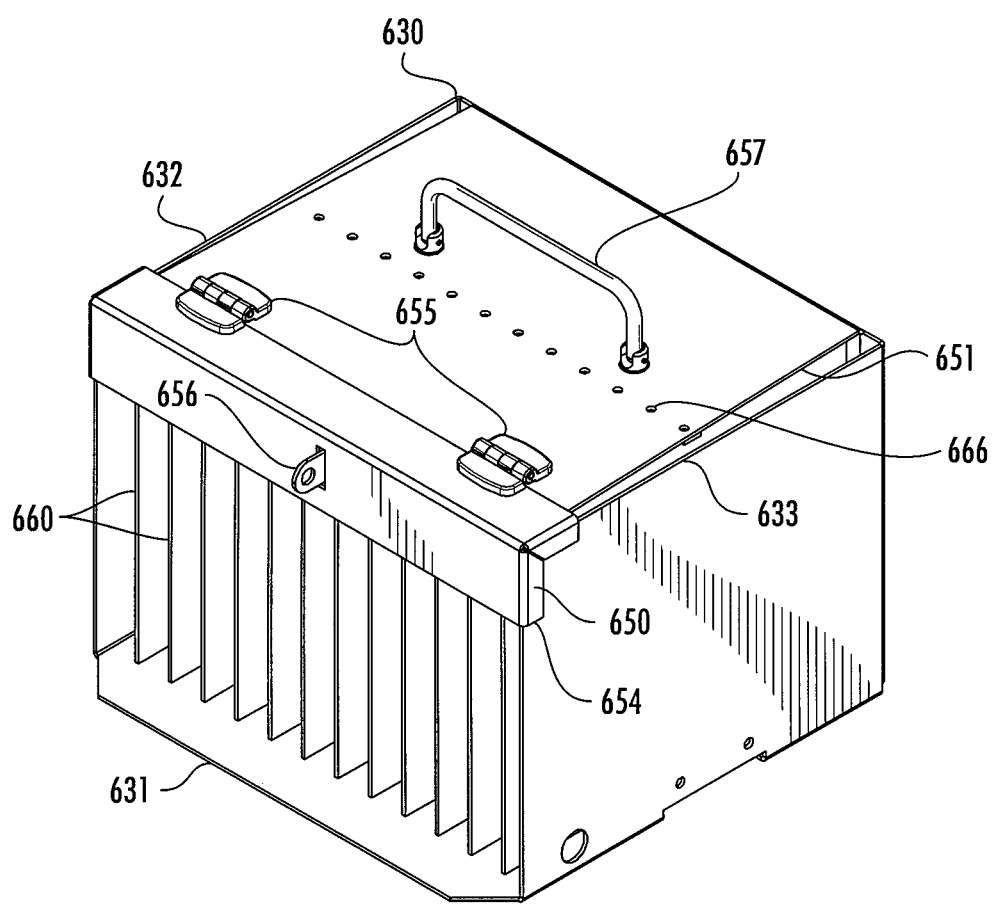
FIG. 20 is an isometric view showing the front, right and top sides of the portable carrier storage and charging assembly of FIG. 19.
Figure 21:
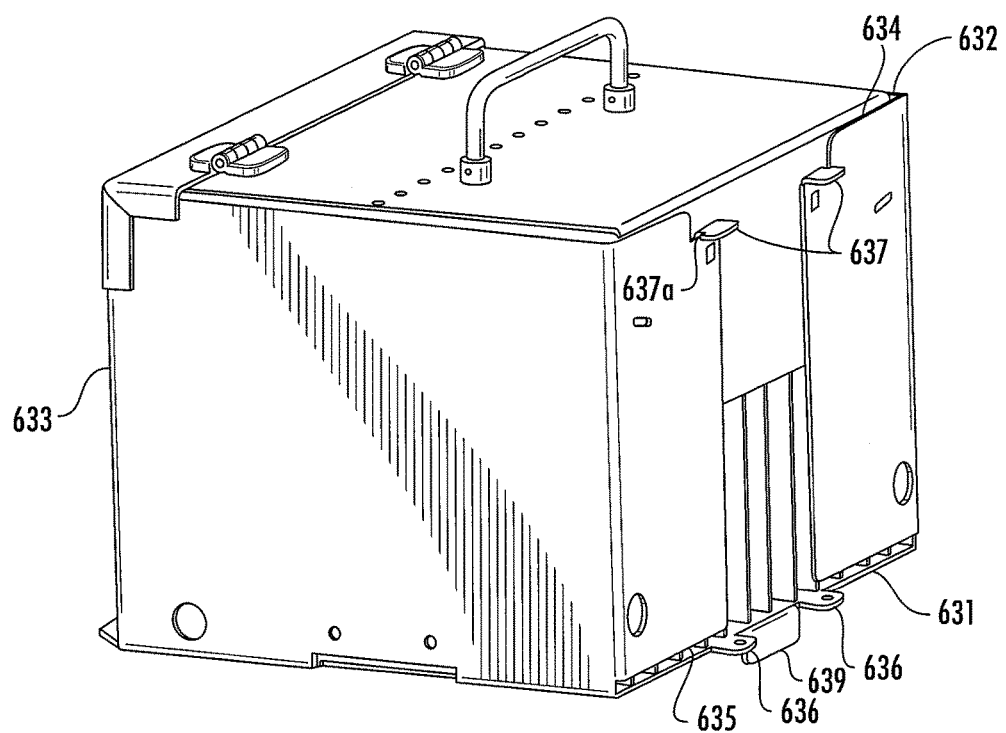
FIG. 21 is an isometric view showing the rear, right and top sides of the portable carrier storage and charging assembly of FIG. 19.

Referring to FIG. 20, it is seen that the exemplary portable carrier assembly 630 has first side portions 632 and second side portions 633 which may be unitarily formed with the assembly bottom portion 631 to permit the side portions 632 and 633 to be flexed inwardly in the same manner as the previously described edge portions 132 and 133 of the shelf portions 130. FIG. 21 illustrates that the illustrated carrier assembly has a first back panel 634 and a second back panel 635 which may respectively be formed from a portion of the first side portion 632 and second side portion 633, and supported thereby in the same manner as the previously shown and described back tabs 134 and 135. In addition, it is seen from FIG. 21 that the portable carrier assembly bottom portion 631 may have retaining tabs 636 projecting from its back edge in the same manner as retaining tabs 136, and a support flange 639 extending downwardly a desired distance from its back edge in the same manner as support flange 139, all as previously illustrated and described herein. Likewise, first back panel 634 and second back panel 635 have retaining hooks 637 with hook portions 637a similar to the retaining hooks 137 and 137a previously shown and described herein. Thus, it can be readily seen that the portable carriage assembly 630 can be easily attached and detached from the support portion 611 in the same manner as described with respect to the attachment of the shelf portions 130 to the support portion 111.

Referring to FIG. 20, it can be seen that the portable carrier assembly 630 has a plurality of partitions 660 extending vertically from the carrier bottom portion 131 to the carrier top portion 651, and spaced to provide a plurality of vertical compartments 662 between the partitions 651 and adjacent partitions and side portions 632, 633 for the segregated containment of a plurality of portable electronic devices. The partitions 660 may be secured to the top portion 651 and the bottom portion 631 by pins 660a (shown in FIG. 19) extending into slots or holes 666 in the top portion 651 and bottom portion 631 of the carrier assembly, or by any other equivalent or alternate structure, including adhesive, welding, fasteners or other known sheet metal attachment structure.

FIG. 20 further illustrates a locking assembly 650 for securing portable electronic devices within the carrier assembly 630. A closure member 654 may be hingedly attached to the top portion 651 of the carrier assembly 630. The closure member 654 may consist of an right angle strip connected by a plurality of hinges 655 to the top portion 651 such that it will pivot to a position with one side of the angled strip lying parallel to the top portion 651 and the other side of the angled strip extending vertically across the front of the carrier assembly 630. A staple 656 may extend from one or more partitions or other interior structure through a slot in the vertically extending portion of closure member 654 to receive a padlock or other common locking device (not shown) to prevent withdrawal of portable electric devices from the carrier during periods of storage. The vertical side of the closure member may be extended as far as necessary to prevent removal of a smaller portable electronic device. Alternatively, a mesh panel (not shown) may be extended from the vertical side of the closure member to cover the entire front of the carrier assembly without blocking the interior from view to prevent removal of small electronic devices such as smart phones. It will be seen that other equivalent structure may be employed to selectively secure the contents within the compartments of the carrier as may be desired, with or without visual access to the contents of the carrier, and to be pivotally or otherwise opened to permit removal of the electronic devices for use.

Finally, a handle 657, which may be foldable to permit closer vertical spacing of the portable carrier assemblies on the support member 610, may be provided to facilitate transport of the portable carrier assembly to different locations for use by designated users. The carrier assembly may further be provided with power strips or wireless battery chargers (not shown) so that the portable electronic devices may be charged at user locations remote from the support member 610.

In operation and use of the tower assemblies 100, 200, 300, 400, 500, 600 a large number of portable electronic devices 50 may be stored at the respective tower assemblies. The devices 50 can then be distributed as needed, for example to students, employees, or to individuals who check the devices out for a period of time. When returned, the devices 50 can be returned to their corresponding shelf portion 130. The devices may subsequently be stored in the tower assembly 100, 200, 300, 400, 500, 600, and the associated batteries may be charged or recharged.

The devices 50 may have indicia for identification, such as a number, name, code, and/or identifying color. The indicia may correspond with an associated indicia provided on one or more of the shelf portions 130. This further assists facilitation of "command and control" of the devices 50, as a person responsible for the devices 50 can quickly inventory devices 50, determine if all of the devices are in or out at any given time, or determine which device 50 is not present in the assembly 100, 200, 300, 400, 500, 600.

In addition, devices 50 may each have remote device monitoring hardware and/or software provided thereon. The device monitoring hardware and/or software may monitor the location of each device 50. In addition, or in the alternative, device monitoring hardware and/or software may monitor whether each device 50 is returned to the correct corresponding shelf portion 130 of assembly 100, 200, 300, 400, 500, 600 after use of the device 50.

Assemblies 100, 200, 300, 400, 500, 600 also include certain advantages that may not be readily ascertainable from the disclosure provided herein. The assembly provides a simple, clean, easy to use space saving design for the effective management of portable electronic devices. The sloped sides of the edge portions of each shelf portion provides an open design which provides easy viewing of electronic devices stored therein. The easy viewing allows for ease of inventory and management of electronic devices. The cable management system provided with the associated channel avoids an undesired mess of inter-tangled cables, while also protecting cables from damage or loss since the cables generally do not need to be removed. The vertical stacking of the plurality of shelf portions provides for a low profile and small footprint, providing space savings. For example, in a school setting, by incorporating the vertical stacking arrangement, the assembly has a footprint similar to a school locker while able to store and manage a full classroom of electronic devices. The locking assembly provides a door having no pinch points, which can avoid damage to cables or users. In addition, by providing a central battery charging and/or recharging location for all portable electronic devices stored in assembly, the risk of loss of battery charging devices is greatly reduced. Since the battery charger, AC adapter, or other charging device remains with the assembly when the portable electronic devices are removed, there is a reduced change of theft or loss of the battery charging device.

In addition, updating or performing a central data transfer to portable electronic devices stored in assembly is made easier. For example, a party performing the update may plug in or hook up a data cable, such as a CAT5 or CAT6 cable, to each device in assembly. As an alternative, each device may be connected to a central data hub while being stored in the assembly, allowing for a distribution of updates through the central data hub. Such a connection may be wired or wireless. In either case, the party performing the update may quickly and easily update portable electronic devices stored in the assembly, as portable electronic devices are centrally located and accessible while being stored. The assembly also allows for users to manage pick up and drop off of portable electronic devices. This is especially advantageous for applications in primary schools, where users may be children, and more specifically young children. In this application, portable electronic devices can be easily picked up and dropped off by children without substantial supervision by an adult or teacher.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although various representative examples of embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to particular embodiments, persons skilled in the art will recognize that changes may be made in form and detail without departing from the spirit and scope of the invention.

What is claimed is:

1. A storage and management assembly for multiple portable electronic devices comprising:
    a tower assembly having a first member coupled to a second member, and the first member coupled to a third member, the second and third members extending away from the first member to define a vertical channel along a first side of the tower assembly; and
    a plurality of shelves removably attachable to a second side of the tower assembly, wherein the second side is opposite the first side, each said shelf defining a storage bay including a generally planar bottom portion having a front margin and a back margin and opposing raised edge portions extending upwardly along opposed sides of the bottom portion for supporting and retaining a portable electronic device on the shelf for storage and charging with bottom portion retaining tabs being received by tower assembly first member first shelf receiving slots, and raised edge portion retaining hooks being received by tower assembly first member second shelf receiving slots, and said retaining hooks being engaged with the tower assembly first member to retain the shelf on said second side of the tower assembly, the raised edge portions having a generally lower height at the front margin of the bottom portion of the shelf than at the back margin thereof near the tower assembly to provide enhanced user visibility of one or more devices received by a plurality of said shelves retained on the tower assembly, wherein the plurality of shelves are provided in a stacked, spaced vertical arrangement along the first member of the tower assembly, and
    the tower assembly and the shelves further defining a plurality of first cable support apertures for support of and entry and exit of electronic cables to and from the channel and the shelves and between the channel and each shelf, the cable support apertures each providing managed electronic cable access for at least one electronic device supported by each shelf at spaced locations along the tower assembly.

2. The storage and management assembly of claim 1, wherein each of the plurality of shelves includes at least one said retaining tab provided about a portion of the perimeter of the bottom portion, the at least one retaining tab being engageable in at least one of said first shelf receiving slots provided in the first member to couple to and vertically support each of the plurality of shelves on the tower assembly.

3. The storage and management assembly of claim 2, wherein a back tab extends from a back end of each raised edge portion at a substantially right angle to approximately parallel a proximate back margin of the perimeter of the bottom portion, and wherein the raised edge portions have a vertical bias such that they can be deflected inwardly toward the bottom portion to enable a said retaining hook extending rearwardly from each back tab and generally parallel to the bottom portion to each respectively engage a one of a said second shelf receiving slots provided in said first member, said raised edge portions then being biased to return to a vertical position and retain the said retaining hooks in engagement with said second shelf receiving slots and further engage end margins of said second shelf receiving slots in a channel of a hook portion of each said retaining hook to additionally retain the shelves on the first member of the tower assembly.

4. The storage and management assembly of claim 1, wherein the tower assembly is coupled to a support base to provide for free standing support of the tower assembly.

5. The storage and management assembly of claim 1, wherein the tower assembly is coupled to a wheeled support base to provide for free standing support and movement of the tower assembly to one or more locations.

6. The storage and management assembly of claim 1, further comprising a first wall engaging tab coupled to the second member and a second wall engaging tab coupled to the third member, the first and second wall engaging tabs are provided in the same plane and parallel to the first member.

7. The storage and management assembly of claim 6, wherein the first and second wall engaging tabs each include at least one mounting aperture, the mounting aperture adapted to receive a mounting member to attach the tower assembly to a substantially vertical flat surface.

8. The storage and management assembly of claim 1, wherein the channel is adapted to support a power distribution assembly.

9. The storage and management assembly of claim 8, wherein the power distribution assembly is a power strip having a plurality of electrical outlets, and wherein the first side of the tower assembly is adapted to support the power strip within the confines of the channel.

10. The storage and management assembly of claim 1, wherein each of the plurality of shelves includes a first slot provided between a first one of the opposing raised edge portions and the bottom portion, and a second slot provided between a second one of the opposing raised edge portions and the bottom portion, and further comprising a locking assembly having a first sidewall received by the first slots of each of the plurality of shelves, a second sidewall received by the second slots of each of the plurality of shelves, a top wall connected to the first and second sidewalls and overlapping a majority of a top most shelf of the plurality of shelves, and a door pivotably connected to one of the first or second sidewall, the door selectively engages a locking member provided on one of the shelves of the plurality of shelves.

11. The storage and management assembly of claim 2, wherein a support flange extends downward from the back margin of the bottom portion of at least one of said shelves for engagement with the second side of the tower assembly when the shelves are coupled thereto to provide additional support and resistance to downward bending of the at least one shelf.

12. A storage and management tower assembly for a plurality of portable electronic devices comprising:
   a tower support;
   a cable management system defined by the tower support, the cable management system includes a central channel provided on a first side of the tower support;
   a plurality of shelves adapted to be individually attachable to a second side of the tower support in removable relation, the second side being opposite the first side, the plurality of shelves being attachable in vertical alignment along the tower support, each of the plurality of shelves includes a storage bay defined by a bottom portion engaged with and extending generally perpendicular to the second side of the tower support and having at least one bottom portion retaining tab extending outwardly from said bottom portion and received by a tower support first shelf receiving slot in supporting relation, opposing raised edge portions provided about a portion of the perimeter of the bottom portion, and back tabs provided about a portion of the perimeter and having retaining hooks extending outwardly from said back tabs each received by a tower support second shelf receiving slot and engaged with the tower support to retain the shelves on the tower support;
   a plurality of first cable support apertures provided through the tower support, wherein at least one said first cable support aperture through the tower support is provided for each of the plurality of shelves; and
   a plurality of second cable support apertures is provided in the plurality of shelves, wherein at least one second cable support aperture provided in each of the plurality of shelves is provided in at least one of the opposing back tabs, wherein the cable management system facilitates storage and protection of one or more cables by allowing each of the one or more cables to extend from the central channel, through a one of the plurality of first cable support apertures provided through the tower support, and through at least one of the plurality of second cable support apertures provided in the plurality of shelves, to the storage bay of each of the shelves.

13. The storage and management tower assembly of claim 12, wherein a power strip is provided in the central channel.

14. The storage and management tower assembly of claim 13, wherein the power strip includes a plurality of electrical outlets.

15. An expandable storage assembly for storing and charging a plurality of portable electronic devices comprising:
   a tower support portion defining a vertical channel provided on a first side of the tower support portion; and
   a plurality of vertically stacked shelves removably attachable to a second side of the tower support portion, the second side being opposite the first side, each of the shelves include a storage bay defined by opposing first and second edge portions which extend upwardly from a bottom portion, the first and second edge portions have a generally decreasing height as the first and second edge portions extend away from the tower support to provide visibility into each of the stacked shelves;
   at least one retaining tab projecting rearwardly from the shelf bottom portion is adapted to be received by at least one associated first shelf receiving slot provided in the second side to provide vertical support for the bottom portion;
   a pair of opposing first and second back tabs provided on each of the shelves, the first back tab being coupled to the first edge portion, the second back tab being coupled to the second edge portion, the first and second back tabs being provided at an approximately perpendicular angle to the respective first and second edge portions, wherein the first and second back tabs each include a retaining hook coupled thereto and projecting rearwardly therefrom and approximately parallel to the plane of the shelf bottom portion, each said retaining hook further having a laterally projecting hook portion to define a channel between the hook portion and the rear surface of the back tab from which the retaining hook projects, said hook portion of each back tab being adapted to be received by an associated one of a pair of second shelf receiving slots in the second side, wherein the first and second back tabs have a bias to facilitate coupling of each said hook portion of the first and second back tabs with a margin of a respective associated one of the pair of second shelf receiving slots to retain the shelf in engagement with the second side;
   a plurality of cable apertures provided through the tower support, wherein at least one cable aperture is provided for each of the plurality of shelves;
   a plurality of shelf apertures, wherein at least one shelf aperture is provided in each of the plurality of shelves, the at least one shelf aperture is provided in at least one of the opposing raised edge portions and back tabs, wherein the cable management system facilitates storage and protection of one or more electronic cables by allowing each of the one or more cables to extend from the tower support vertical channel through a one of the plurality of cable apertures, and through at least one of the plurality of shelf apertures, to each of the shelves.

16. The storage and management system assembly of claim 15, wherein a support flange extends downward from a back margin of the bottom portion of at least one of said shelves to engage the second side of the tower support portion and provide additional resistance to downward bending of the said at least one of said shelves.

* * * * *